(12) United States Patent
Hicks et al.

(10) Patent No.: US 10,663,276 B2
(45) Date of Patent: *May 26, 2020

(54) RETRACTABLE INDEX PINS AND METHODS OF OPERATING THEREOF

(71) Applicant: The Boeing Company, Chicago, IL (US)

(72) Inventors: Jason L. Hicks, Greenbank, WA (US); Kevin M. Barrick, Kingston, WA (US); Branko Sarh, Huntington Beach, CA (US); Harinder S. Oberoi, Snohomish, WA (US)

(73) Assignee: The Boeing Company, Chicago, IL (US)

(*) Notice: Subject to any disclaimer, the term of this patent is extended or adjusted under 35 U.S.C. 154(b) by 172 days.

This patent is subject to a terminal disclaimer.

(21) Appl. No.: 15/965,262

(22) Filed: Apr. 27, 2018

(65) Prior Publication Data

US 2018/0245904 A1 Aug. 30, 2018

Related U.S. Application Data

(63) Continuation of application No. 15/218,346, filed on Jul. 25, 2016, now Pat. No. 10,001,359.

(51) Int. Cl.
*G01B 5/25* (2006.01)
*B23P 19/10* (2006.01)
*F16B 19/02* (2006.01)

(52) U.S. Cl.
CPC ............. *G01B 5/25* (2013.01); *B23P 19/10* (2013.01); *F16B 19/02* (2013.01); *B23P 2700/01* (2013.01)

(58) Field of Classification Search
CPC ....................................................... G01B 5/25
(Continued)

(56) References Cited

U.S. PATENT DOCUMENTS 1,369,544 A * 2/1921 Renfro .................. B25B 27/062
                                                              29/262
3,711,955 A * 1/1973 Holt ........................ G01B 5/25
                                                              33/661
(Continued)

FOREIGN PATENT DOCUMENTS

JP          2014031803 A      2/2014

OTHER PUBLICATIONS

"U.S. Appl. No. 15/218,346, Notice of Allowance dated Jan. 12, 2018", 8 pages.

(Continued)

*Primary Examiner* — George B Bennett
(74) *Attorney, Agent, or Firm* — Kwan & Olynick LLP

(57) ABSTRACT

Provided are self-retractable centering assemblies and methods of using these assemblies for alignment of parts having determinant assembly alignment holes. An assembly includes a center pin having a threaded portion threadably engaging a drive component. The assembly also includes a puller bushing rotatably coupled to the drive component. The center pin protrudes through the puller bushing and can slide with respect to the puller bushing when the drive component is rotated relative to the center pin. The sliding distance is controlled by a limiter disposed within the cavity of the puller bushing. During operation, a portion of the center pin extends from the puller bushing and is inserted into alignment holes of parts being aligned. The drive component is rotated relative to the center pin resulting in the center pin being pulled out of the alignment holes while the puller bushing is being pressed against the parts.

20 Claims, 19 Drawing Sheets

(58) Field of Classification Search
USPC .......................................... 33/520, 613, 645
See application file for complete search history.

(56) References Cited

U.S. PATENT DOCUMENTS

| | | | |
|---|---|---|---|
| 3,864,834 A | 2/1975 | Horton | |
| 4,754,551 A * | 7/1988 | Scott | G01B 5/252 |
| | | | 33/520 |
| 5,138,772 A | 8/1992 | Barnes | |
| 5,168,638 A | 12/1992 | Barton | |
| 5,590,474 A * | 1/1997 | Lamb | B25B 27/16 |
| | | | 29/271 |
| 6,151,792 A * | 11/2000 | Ohlig | G03F 9/00 |
| | | | 248/309.2 |
| 6,338,203 B1 | 1/2002 | Strickland | |
| 7,458,169 B1 * | 12/2008 | Coope | B23Q 3/183 |
| | | | 33/645 |
| 10,001,359 B2 * | 6/2018 | Hicks | B23P 19/10 |
| 2003/0217477 A1 | 11/2003 | Thurmaier | |
| 2007/0017109 A1 | 1/2007 | Guzik et al. | |
| 2010/0257747 A1 | 10/2010 | Guzik et al. | |
| 2014/0096365 A1 | 4/2014 | Sarh et al. | |
| 2014/0173873 A1 * | 6/2014 | Butterfield, IV | G01B 5/25 |
| | | | 29/407.09 |
| 2017/0089686 A1 | 3/2017 | Mackenzie | |
| 2017/0239709 A1 | 8/2017 | Oberoi et al. | |
| 2018/0023939 A1 | 1/2018 | Hicks et al. | |

OTHER PUBLICATIONS

"European Application Serial No. 17182517.7, Search Report dated Nov. 24, 2017", 6 pgs.

* cited by examiner

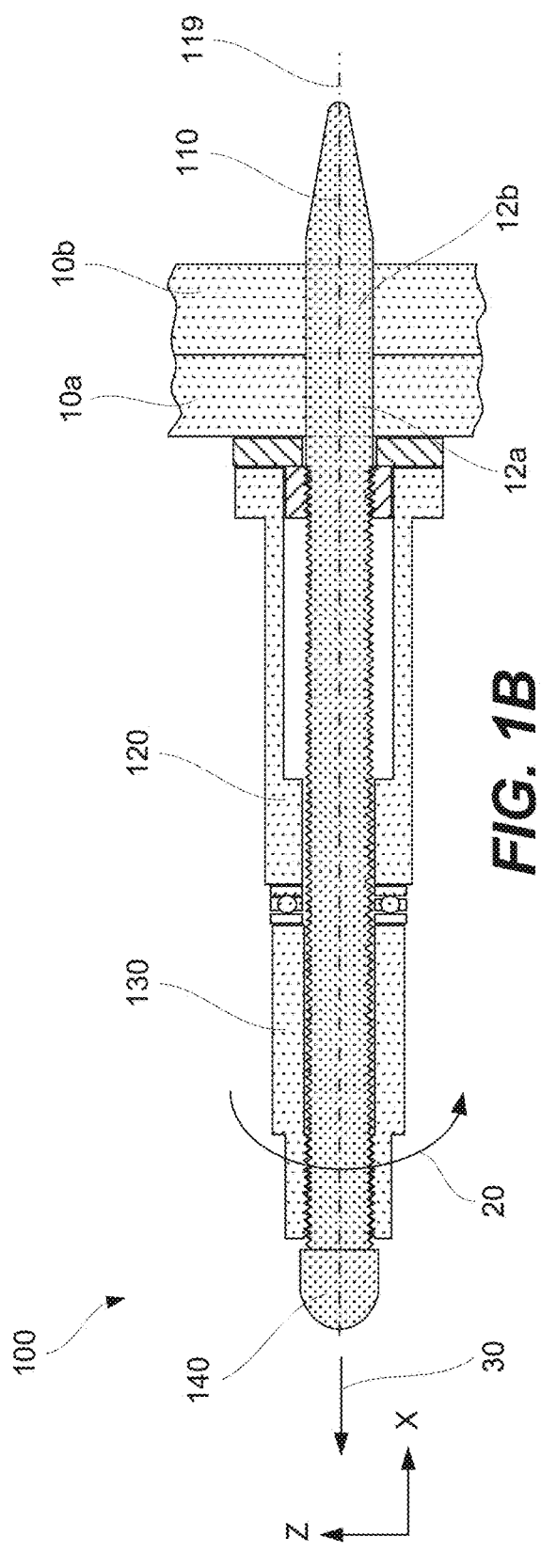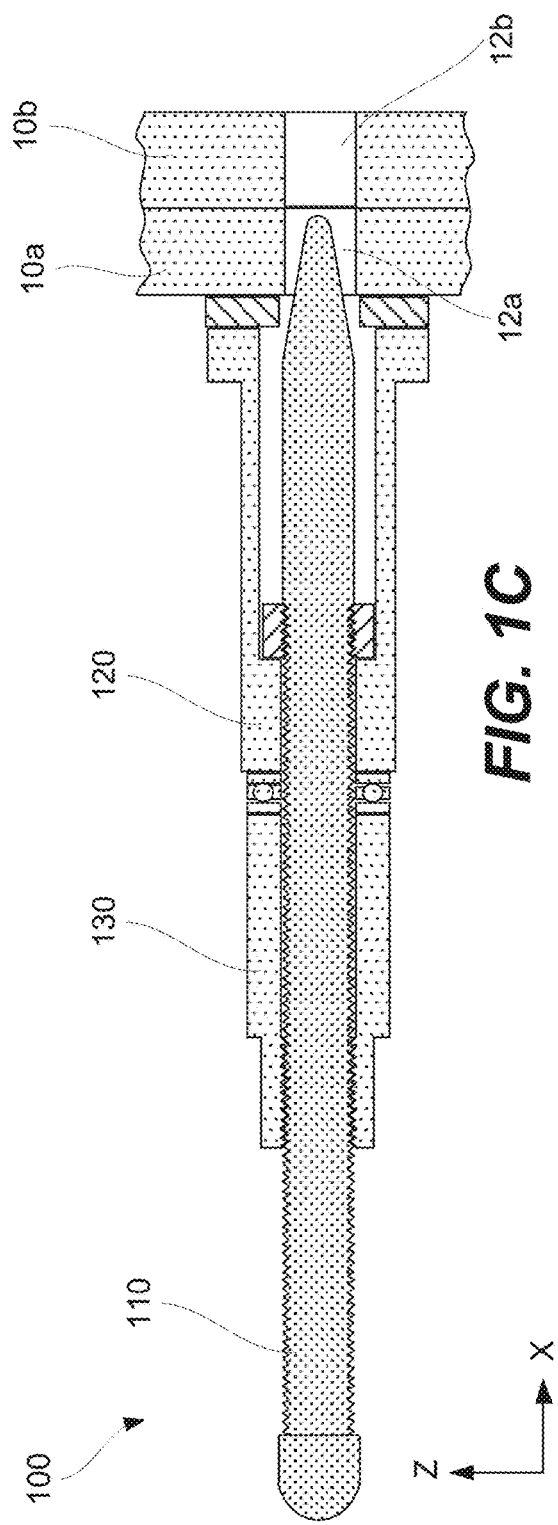

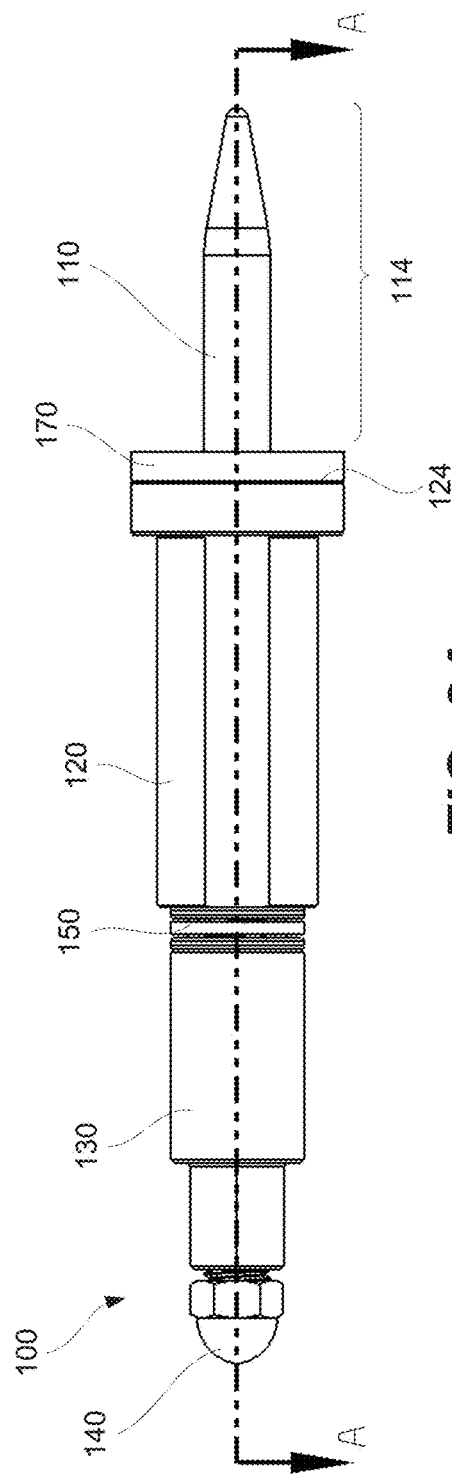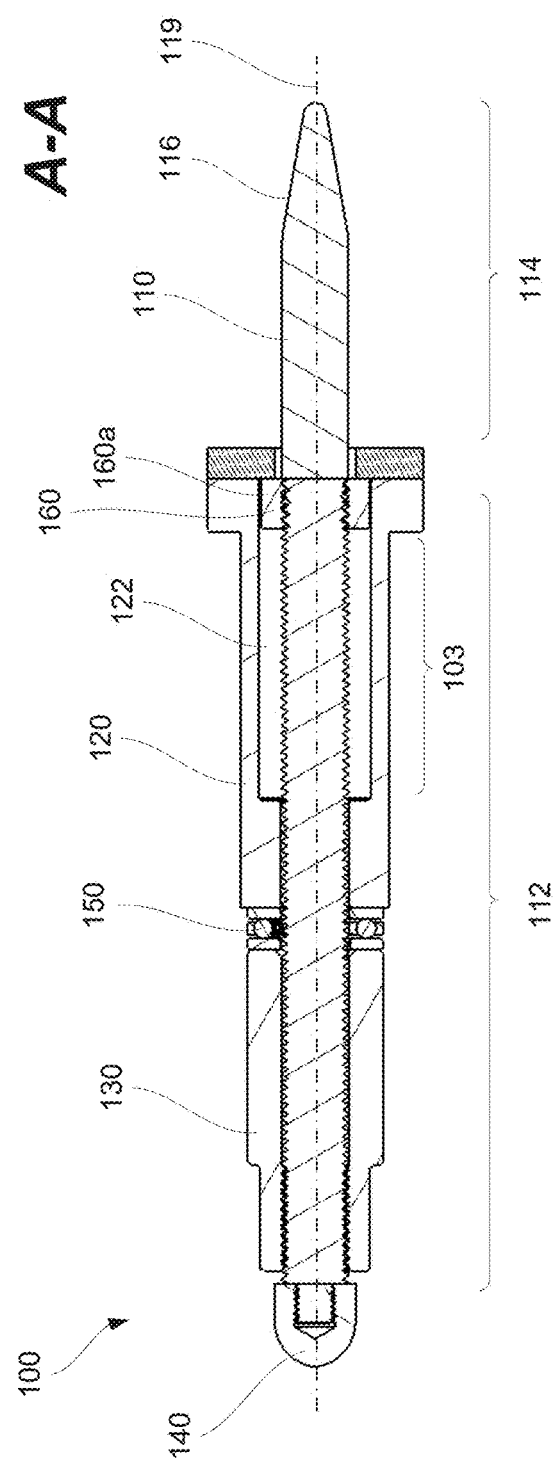

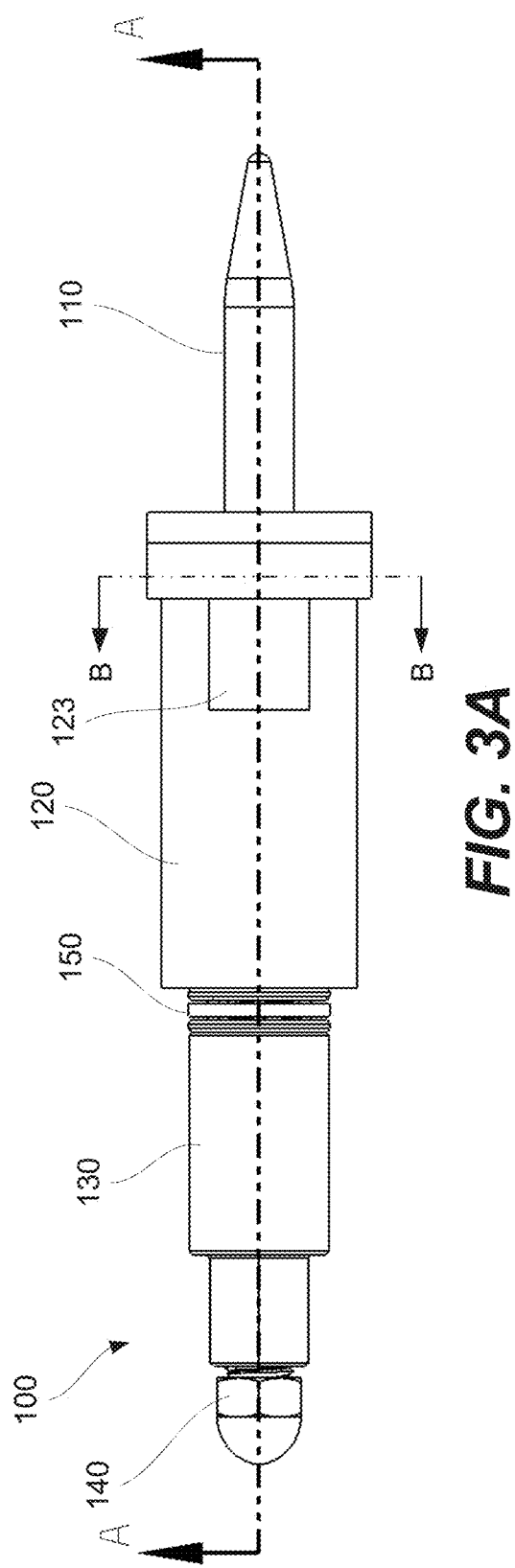
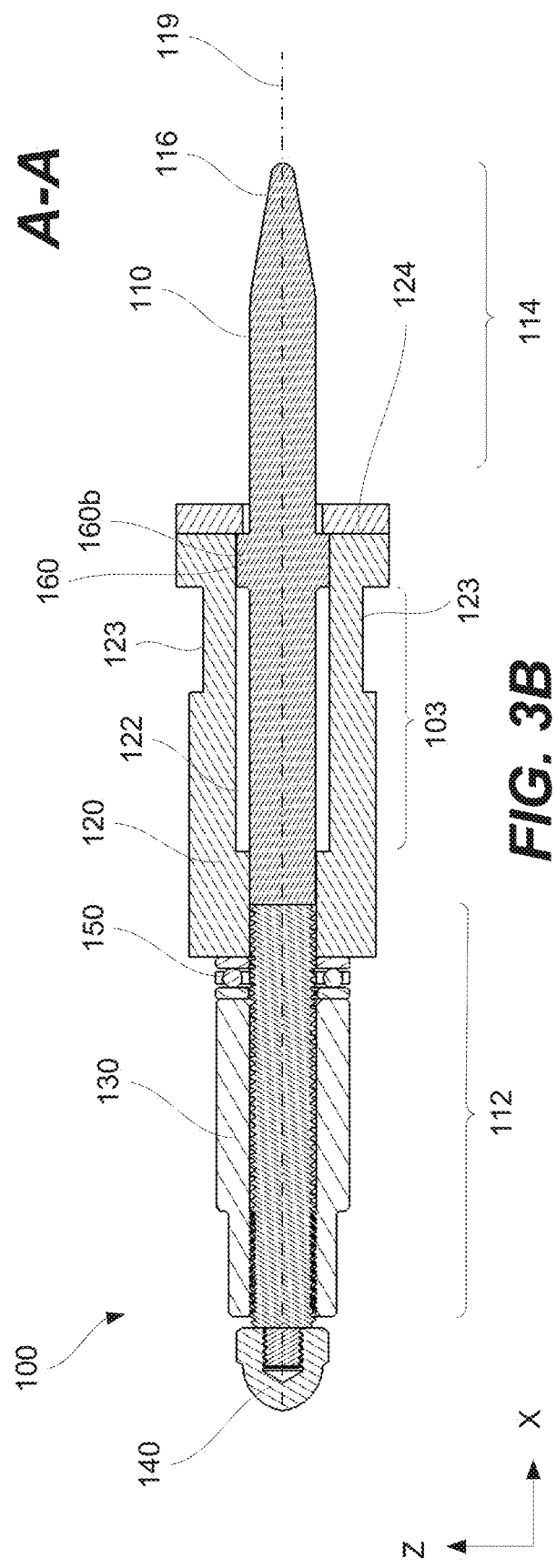

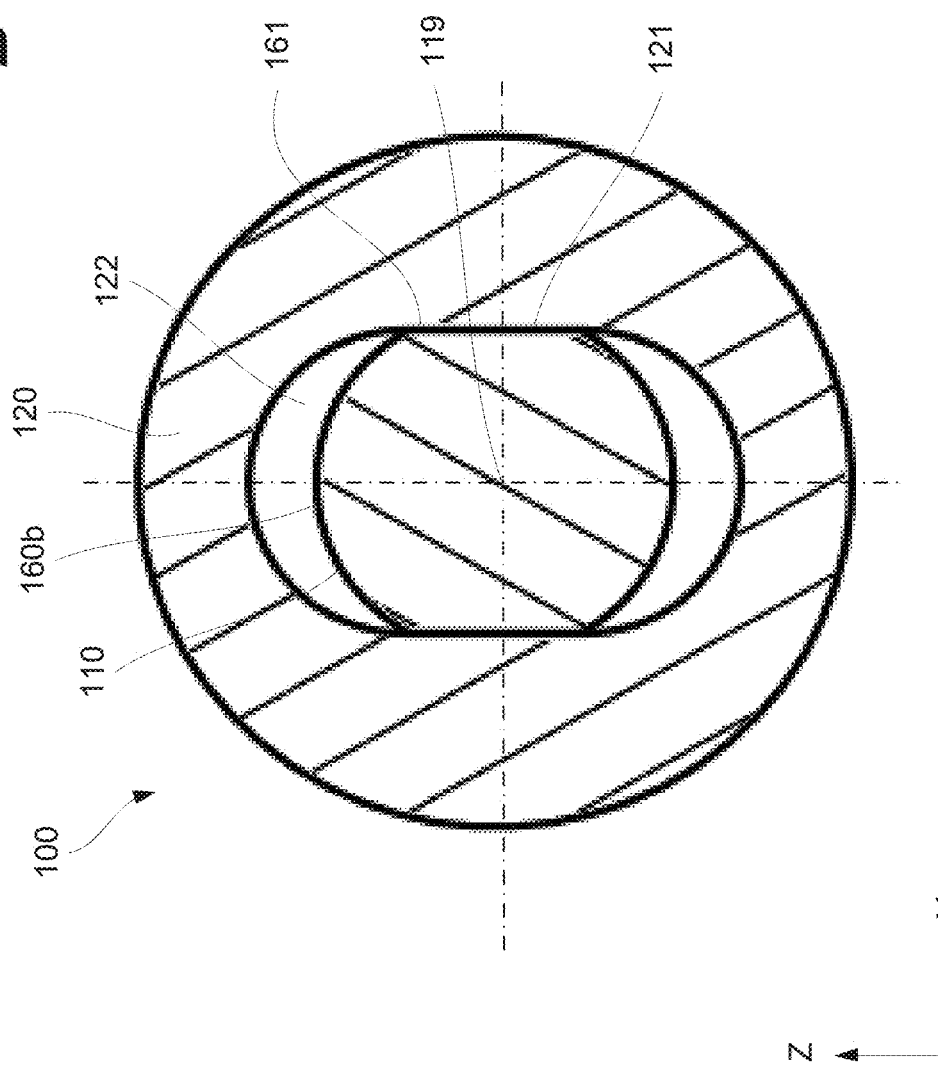

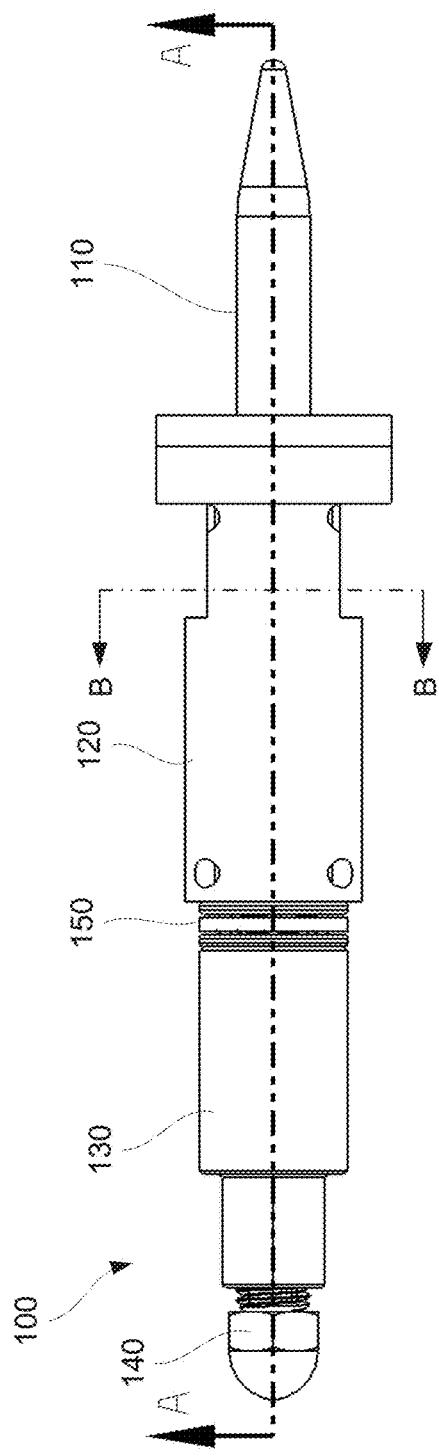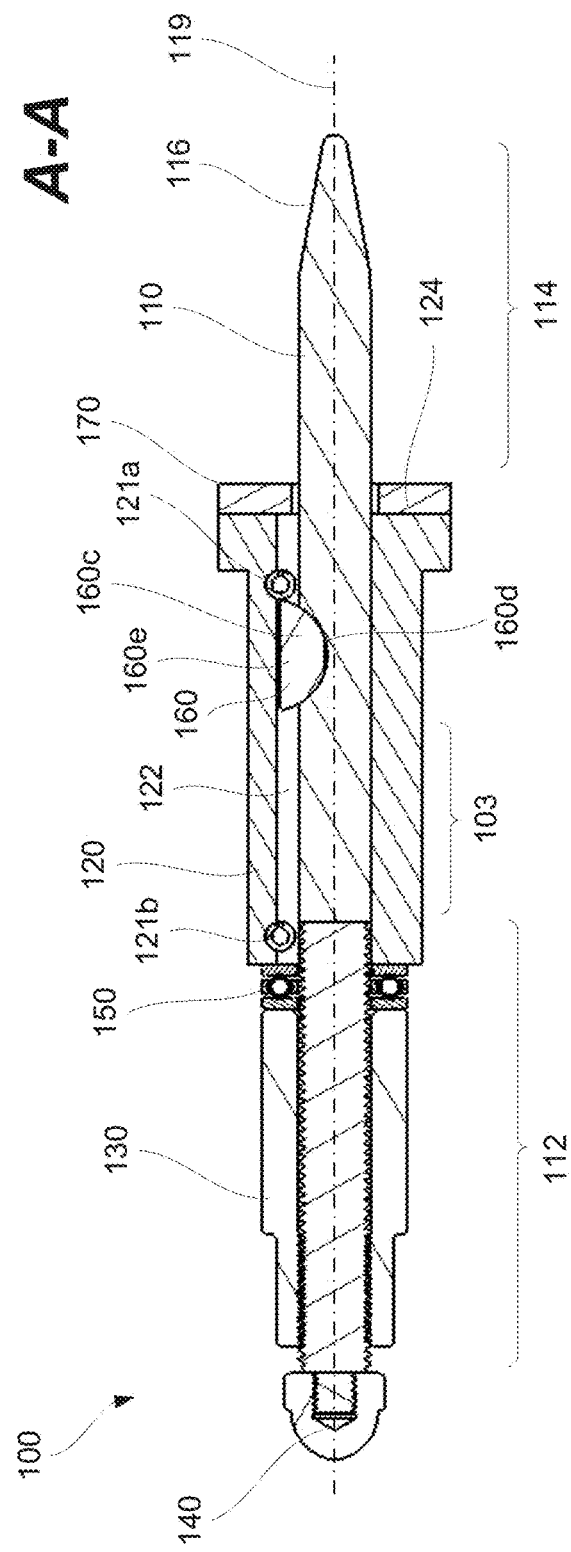

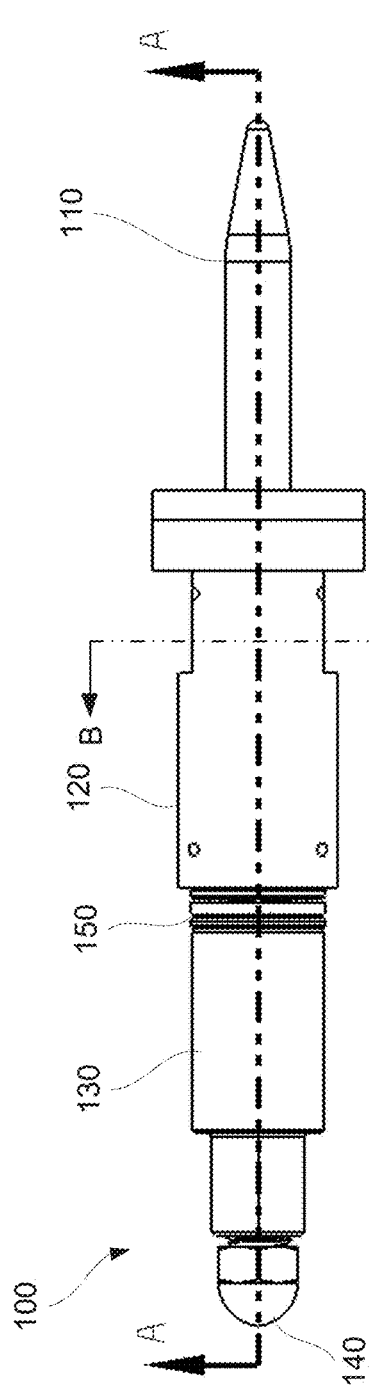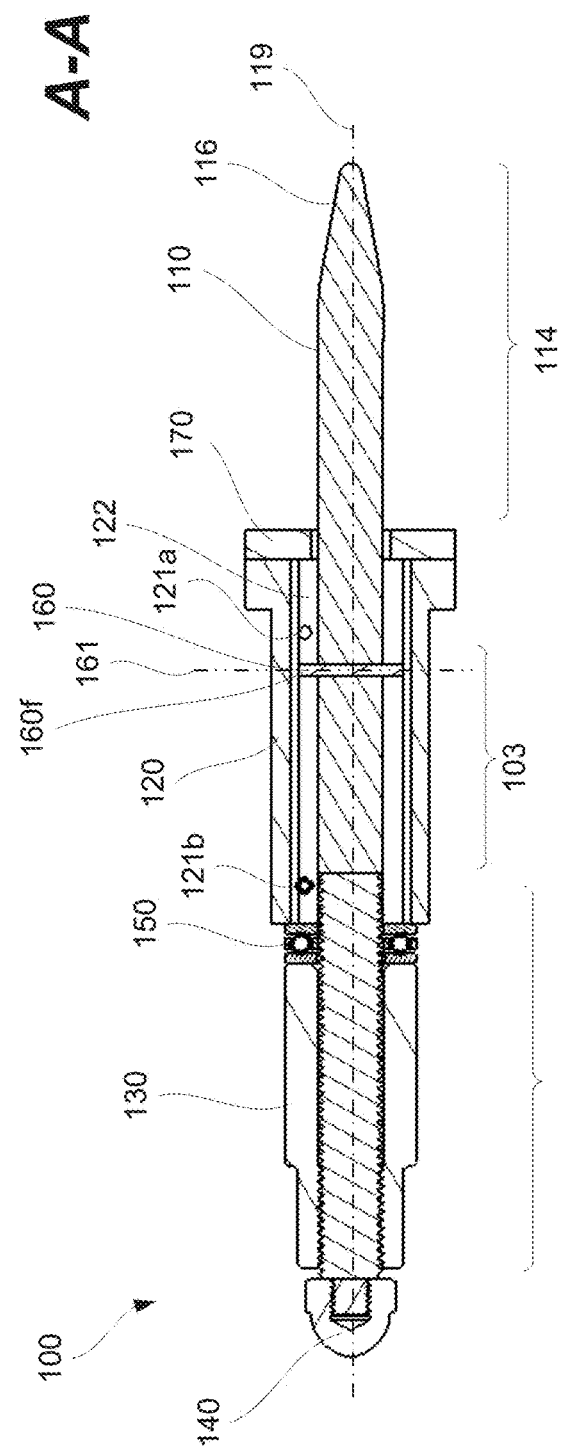

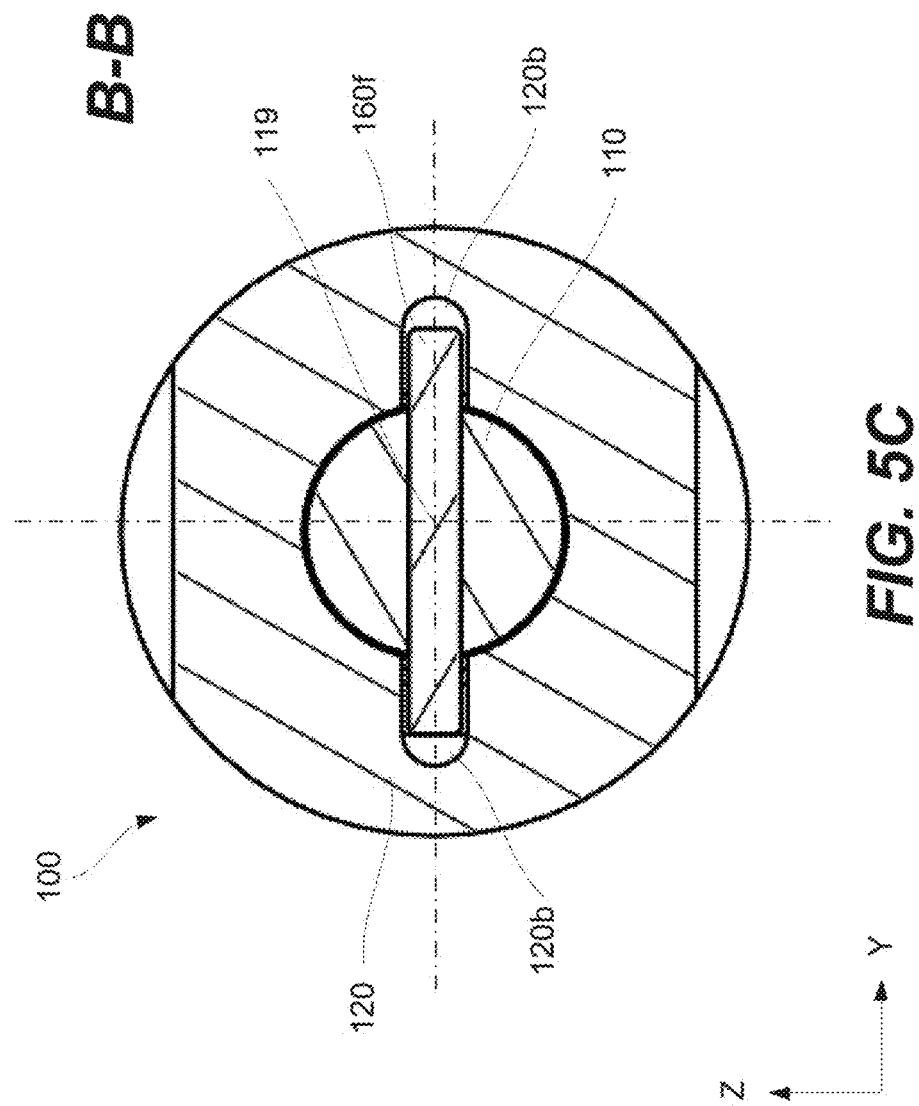

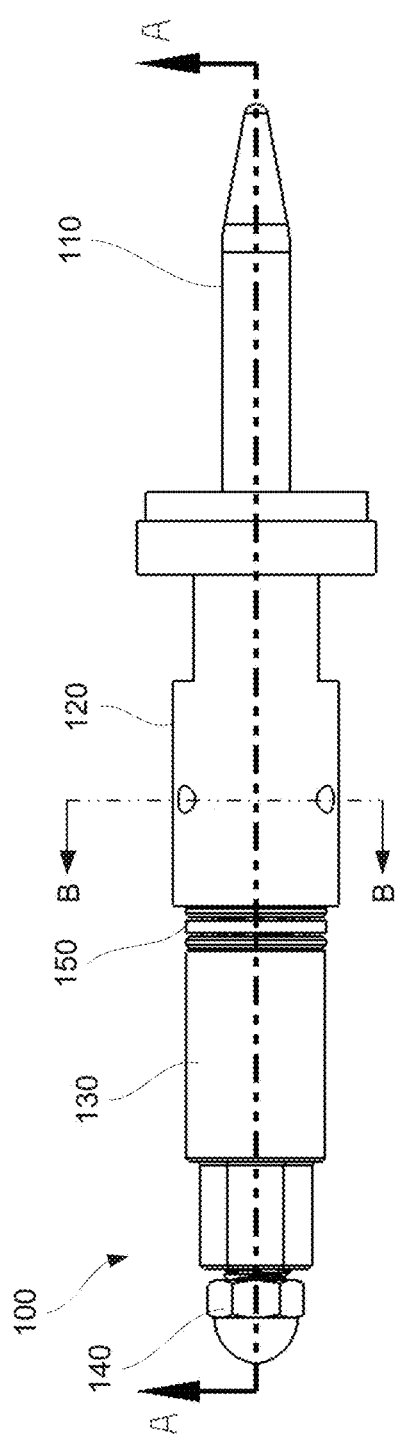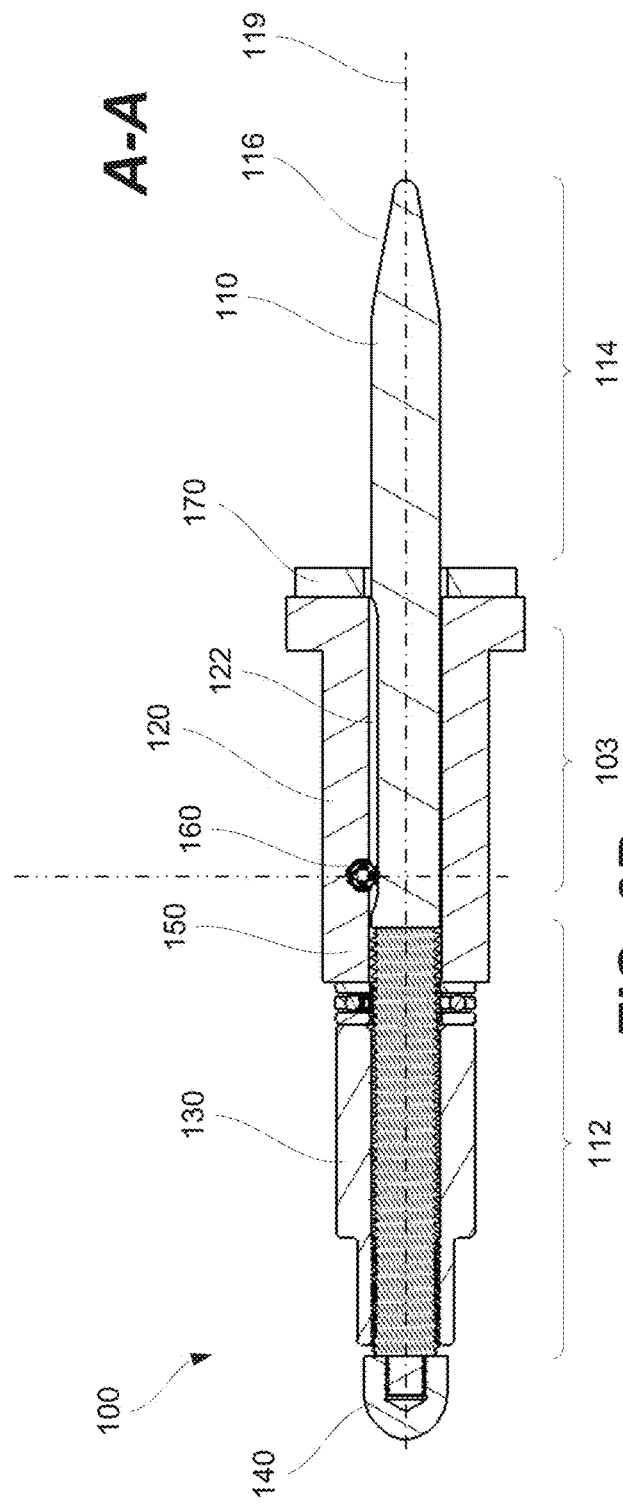

RETRACTABLE INDEX PINS AND METHODS OF OPERATING THEREOF

CROSS-REFERENCE TO RELATED APPLICATIONS

This application is a continuation of U.S. patent application Ser. No. 15/218,346, entitled: "RETRACTABLE INDEX PINS AND METHODS OF OPERATING THEREOF" filed on Jul. 25, 2016, which is incorporated herein by reference in its entirety for all purposes.

BACKGROUND

Many conventional alignment methods utilize pins inserted into determinant assembly alignment holes of two or more parts while these parts are being aligned. The tight fit of these pins in the holes ensures precise alignment of the holes and, as a result, precise alignment of the parts. However, removal of these pins from the alignment holes can be challenging because of the tight fit. Various designs with different levels of success have been tried. For example, aircraft manufacturing typically uses L-shaped pins. An L-shaped pin includes a handle extending perpendicular to the insertion portion. The handle is used during installation and removal of these pints. However, even with the available handles, the L-shaped pins are being manually removed using, for example, a hammer. Hammering is needed to overcome the high friction forces between the pins and alignment holes associated with the tight fit. Hammering may be undesirable for some parts, such as composites, because of highly concentrated force spikes. Furthermore, hammering may not be desirable from ergonomic perspectives. What is needed are alignment pins and pin removal methods exerting lower and more uniform stress on aligned parts.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are self-retractable centering assemblies and methods of using these assemblies for alignment of parts having determinant assembly alignment holes. An assembly includes a center pin having a threaded portion threadably engaging a drive component. The center pin may be also referred to as an index pin. The assembly also includes a puller bushing rotatably coupled to the drive component. The center pin protrudes through the puller bushing and can slide with respect to the puller bushing when the drive component is rotated relative to the center pin. The sliding distance is controlled by a limiter disposed within the cavity of the puller bushing. During operation, a portion of the center pin extends from the puller bushing and is inserted into alignment holes of parts being aligned. The drive component is rotated relative to the center pin resulting in the center pin being pulled out of the alignment holes while the puller bushing is being pressed against the parts.

In some embodiments, a self-retractable centering assembly comprises a center pin, a puller bushing, a drive component, and a limiter. The center pin comprises a threaded portion. The puller bushing comprises a cavity. The center pin protrudes through the cavity of the puller bushing. The center pin is slidable relative the puller bushing along the center axis of the center pin. The drive component is rotatably coupled to the puller bushing. The drive component threadably engages the threaded portion of the center pin such that rotation of the drive component relative to the center pin and around the center axis of the center pin slides the center pin relative to drive component and, as a result, relative to the puller bushing. The limiter is disposed within the cavity of the puller bushing and limiting the sliding distance of the center pin relative to the puller bushing. Specifically, the limiter may limit how much the center pin extends out of the puller bushing in its extended state. Furthermore, the limiter may limit how much the center pin retracts into the puller bushing when it moves into its retracted state. The travel of the center pin between its fully retracted state and its fully extended state is referred to as a sliding distance.

In some embodiments, the limiter is a stop nut threadably engaging the threaded portion of the center pin. Alternatively, the limiter may be a collar of the center pin. Furthermore, the limiter may be a slot key protruding into a slot of the center pin. The slot key may be a Woodruff key. In some embodiments, the limiter is a transverse pin protruding through the center pin in a direction perpendicular to the center axis of the center pin and extending away from the center pin. In these embodiments, the limiter may be constrained by internal surfaces of the cavity. For example, front and back sides of the cavity (defined along the center axis) may be operable as positive stops for the limiter. Alternatively, other components may be used as stops. For example, the limiter may be a combination of a sliding planar surface of the center pin and a protrusion fixed relative the puller bushing. The sliding planar surface extends parallel to the center axis of the center pin.

In some embodiments, the center pin is not rotatable relative to the puller bushing. For example, the self-retractable centering assembly may further comprise a coupling component non-rotatably engaging the puller bushing and the center pin. Specifically, the coupling component may non-rotatably engage the center pin through an end component non-rotatably connected to the end of the center pin opposite to the insertion portion of the center pin.

In some embodiments, the center pin comprises a collar disposed within the cavity such that both the collar and the cavity of the puller bushing have non-circular cross-sectional shapes within a plane perpendicular to the center axis of the center pin. As a result of these non-circular cross-sectional shapes the center pin is not rotatable relative to the puller bushing. Specifically, the cavity may have an elliptical cross-sectional shape within the plane perpendicular to the center axis of the center pin. In these embodiments, the collar may be also operable as a limiter.

In some embodiments, the self-retractable centering assembly further comprises a slot key protruding into a slot of the center pin and into a sliding slot of the puller bushing. This combination of the slot key and the slot results in the center pin being not rotatable relative to the puller bushing. As noted above, a combination of the slot key and the slot may be operable as a limiter as well.

In some embodiments, the self-retractable centering assembly further comprises a transverse pin protruding through the center pin in a direction perpendicular to the center axis of the center pin. The transverse pin extends away from the center pin and into two slots of the puller bushing. This combination of the transverse pin and the two slots results in the center pin being not rotatable relative to the puller bushing. As noted above, a combination of the transverse pin and the two slots may be operable as a limiter as well.

In some embodiments, the self-retractable centering assembly further comprises a sliding planar surface of the center pin and a protrusion fixed relative the puller bushing. The sliding planar surface extends parallel to the center axis of the center pin. This combination of the sliding planar surface and the protrusion results in the center pin being not rotatable relative to the puller bushing. As noted above, a combination of the sliding planar surface and the protrusion may be operable as a limiter as well.

In some embodiments, the drive component is rotatably coupled to the puller bushing using a thrust bearing. Specifically, the thrust bearing may be disposed between the drive component and the puller bushing and allow for the drive component relative the puller bushing while exerting a force onto the puller bushing in the direction along the center axis of the center pin.

In some embodiments, the center pin comprises an insertion portion. The insertion point protracts out of the cavity and retracts into the cavity as the center pin slides relative the puller bushing or, more specifically, as the drive component rotates relative to the center pin. The insertion portion of the center pin comprises a tip, which may have a tapered shape. This tapered shape allows insertion of the center pin into initially misaligned holes.

In some embodiments, the self-retractable centering assembly further comprises a surface engaging component disposed on a side of the puller bushing opposite of the drive component. The surface engaging component may comprise polymer. The surface engaging component may be used to protect a part when the puller bushing is pressed against the part during extraction of the center pin. The side of the puller bushing opposite of the drive component may extend substantially perpendicular to the center axis of the center pin.

Provided also is a method of aligning a first part comprising a first determinant assembly alignment hole relative to a second part comprising a second determinant assembly alignment hole. In some embodiments, the method comprises inserting a center pin of a self-retractable centering assembly into the first determinant assembly alignment hole and the second determinant assembly alignment hole. The method may also comprise retracting the center pin from the first determinant assembly alignment hole and the second determinant assembly alignment hole. This retracting of the center pin may comprise rotating a drive component of the self-retractable centering assembly relative to the center pin and around a center axis of the center pin thereby sliding the center pin relative to a puller bushing of a self-retractable centering assembly. The puller bushing may be being pressed against the first part while retracting the center pin.

In some embodiments, after inserting the center pin into the first determinant assembly alignment hole and into the second determinant assembly alignment hole, a center axis of first determinant assembly alignment hole coincides with a center axis of the second determinant assembly alignment hole.

In some embodiments, rotating the drive component relative to the center pin comprises supporting the puller bushing. For example, the puller bushing may be supported by an operator using a wrench or some other suitable tool. In some embodiments, the puller bushing is supported using a coupling component of the self-retractable centering assembly. In these embodiments, the puller bushing is supported together with the center pin.

In some embodiments, the drive component rotates relative to the puller bushing while retracting the center pin. However, the puller bushing may not rotate relative to the center pin during this operation.

In some embodiments, the center pin does not rotate within the first determinant assembly alignment hole relative to the first part or within the second determinant assembly alignment hole relative to the second part while the center pin being retracted from the first determinant assembly alignment hole and from the second determinant assembly alignment hole. Furthermore, the puller bushing may be stationary relative to the first part as the center pin being retracted from the first determinant assembly alignment hole and from the second determinant assembly alignment hole. Specifically, the puller bushing may not rotate relative to the first part. Furthermore, the puller bushing does not move linearly along the center axis during this operation. Alternatively, the puller bushing rotates relative to the first part. In these embodiments, the center pin may also rotate within the first determinant assembly alignment hole relative to the first part or within the second determinant assembly alignment hole relative to the second part as the center pin being retracted from the first determinant assembly alignment hole and the second determinant assembly alignment hole.

In some embodiments, the method further comprises, after retracting the center pin, increasing the size of at least one of the first determinant assembly alignment hole and the second determinant assembly alignment hole. In some embodiments, the size of both holes is increased. In the same or other embodiments, the method may comprise, after retracting the center pin, installing a fastener into the first determinant assembly alignment hole and the second determinant assembly alignment hole.

These and other embodiments are described further below with reference to the figures.

BRIEF DESCRIPTION OF THE DRAWINGS

FIG. 1B is another schematic illustration of two parts being aligned using a self-retractable centering assembly prior to retracting the center pin of the assembly from the determinant assembly alignment holes of the parts, in accordance with some embodiments.

FIG. 1C is a schematic illustration of the two parts of FIG. 1B after retracting the center pin of the assembly from the determinant assembly alignment holes of the two parts, in accordance with some embodiments.

FIG. 2A is a schematic side view of a self-retractable centering assembly, in accordance with some embodiments.

FIG. 2B is a schematic cross-sectional view of the self-retractable centering assembly of FIG. 2A illustrating various internal features of the assembly, in accordance with some embodiments.

FIG. 3A is a schematic side view of a self-retractable centering assembly, in accordance with some embodiments.

FIGS. 3B and 3C are schematic cross-sectional views of the self-retractable centering assembly of FIG. 3A illustrating various internal features of the assembly, in accordance with some embodiments.

FIG. 4A is a schematic side view of a self-retractable centering assembly, in accordance with some embodiments.

FIGS. 4B and 4C are schematic cross-sectional views of the self-retractable centering assembly of FIG. 4A illustrating various internal features of the assembly, in accordance with some embodiments.

FIG. 5A is a schematic side view of a self-retractable centering assembly, in accordance with some embodiments.

FIGS. 5B and 5C are schematic cross-sectional views of the self-retractable centering assembly of FIG. 5A illustrating various internal features of the assembly, in accordance with some embodiments.

FIG. 6A is a schematic side view of a self-retractable centering assembly, in accordance with some embodiments.

FIGS. 6B and 6C are schematic cross-sectional views of the self-retractable centering assembly of FIG. 6A illustrating various internal features of the assembly, in accordance with some embodiments.

DETAILED DESCRIPTION

Figure 1A:
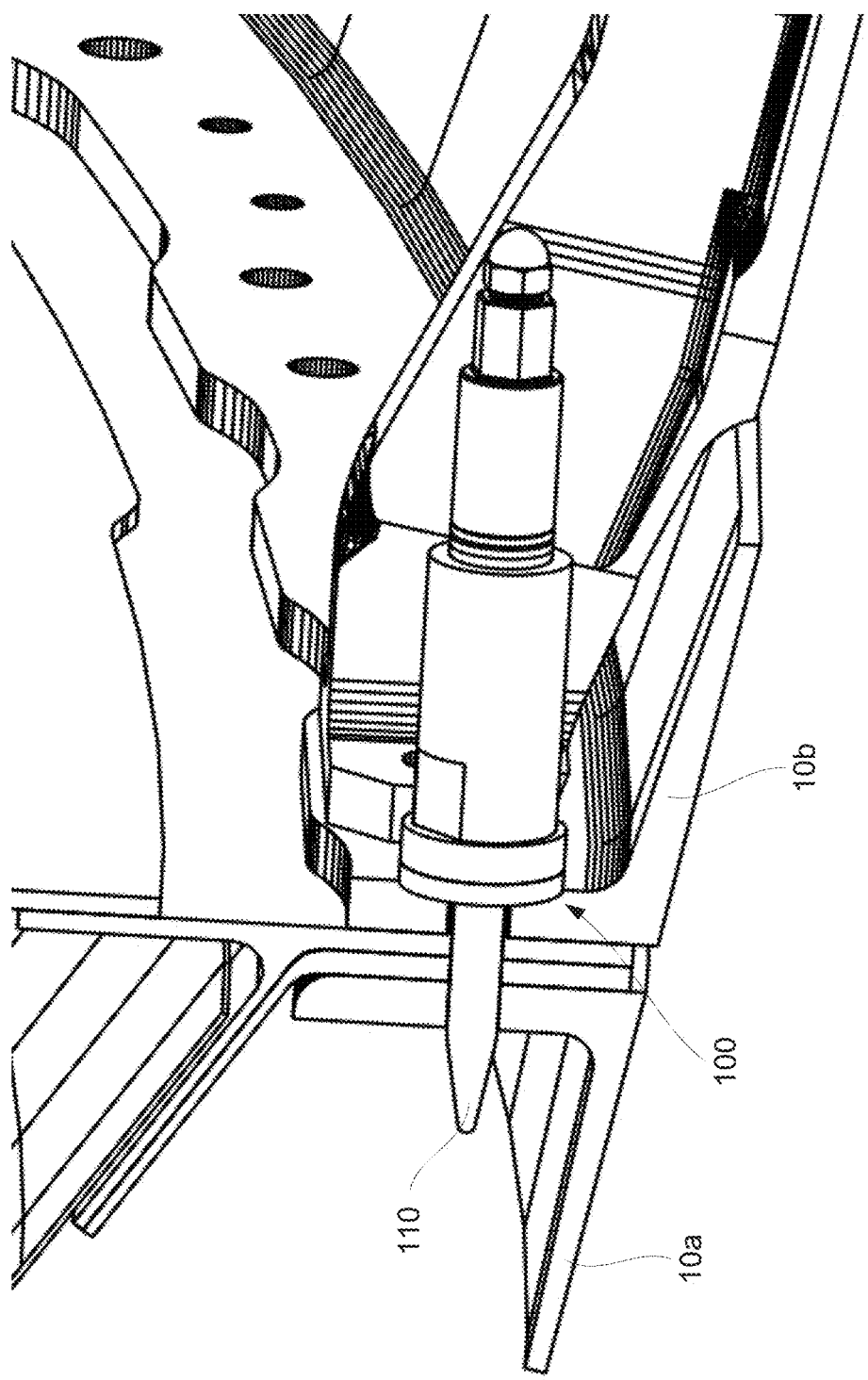
FIG. 1A is a schematic illustration of two parts being aligned using a self-retractable centering assembly, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the present disclosure as defined by the appended claims.

Introduction

Different parts may be precisely aligned using determinant assembly alignment holes provided in these parts as well as center pins protruding into these alignment holes. However, retracting the center pins from the alignment holes can be challenging because of high friction forces between the center pins and the alignment holes, as noted above. Provided are self-retractable centering assemblies and methods of using these assemblies for parts' alignment. An assembly includes a center pin having a threaded portion threadably engaging a drive component. This threaded portion is used for extracting the center pin from alignment holes. Specifically, the drive component is rotated relative to the center pin and causes the center pin to slide linearly along the center axis of the center pin with respect to the drive component. The assembly includes a puller bushing rotatably coupled to the drive component. The center pin protrudes through the puller bushing and can slide with respect to the puller bushing when the drive component is rotated relative to the center pin. The puller bushing is disposed between the drive component and the parts being aligned and is pressed against these parts while retracting the center pin. The puller bushing allows for the drive component to rotate relative to the parts.

The sliding distance of the center pin is controlled by a limiter, which may be disposed within the cavity of the puller bushing. During operation, a portion of the center pin extends from the puller bushing and is inserted into alignment holes of parts being aligned. The drive component is rotated relative to the center pin resulting in the center pin being pulled out of the alignment holes while the puller bushing is being pressed against the parts. The total travel of the center pin between its retracted position and its extended position is defined as the sliding distance. The limiter allows to control the insert depth of the center pin into determinant assembly alignment holes, which may help to avoid damaging the parts being aligned. Furthermore, the limiter also allows to control when the puller bushing can be separated from the parts. For example, the puller bushing may be required to contact the part until the center pin is in its complete retracted position.

The presented self-retractable centering assembly allows for simple removal of the center pin without using a hammer or other impact tools thereby preserving integrity of parts being aligned as well as integrity of the self-retractable centering assembly. The center pin retraction is achieved by rotating the drive component relative to the center pin.

FIG. 1A is a schematic illustration of two parts 10a and 10b being aligned using self-retractable centering assembly 100, in accordance with some embodiments. Other embodiments are also within the scope. In the illustrated embodiments, first part 10a may be a pressure bulkhead or, more specifically, an aft frame of the bulkhead ring of an aircraft. Second part 10b may a forward frame of the aircraft. In this example, center pin 110 of self-retractable centering assembly 100 protrudes through both first part 10a and second part 10b. One having ordinary skills in the art would understand that self-retractable centering assembly 100 may be used to align any two or more parts having determinant assembly alignment holes and are not limited to the types of parts 10a and 10b shown in FIG. 1A. In general, any types of parts having determinant assembly alignment holes may be aligned using self-retractable centering assembly 100. These parts and alignment may be used for any applications. Furthermore, while only one self-retractable centering assembly 100 is shown in FIG. 1A, one having ordinary skills in the art would understand that two or more self-retractable centering assemblies 100 may be used to aligned the same set of parts. The set of parts may include two, three, or more parts.

FIG. 1B is another schematic illustration of two parts 10a and 10b being aligned using self-retractable centering assembly 100 prior to retracting center pin 110 of assembly 100 from determinant assembly alignment holes 12a and 12b of parts 10a and 10b, in accordance with some embodiments. In these embodiments, parts 10a and 10b are aligned. Center pin 110 may be tightly fit in determinant assembly alignment holes 12a and 12b and its removal from determinant assembly alignment holes 12a and 12b may require a significant force along center axis 119 of center pin 110. This force is achieved by applying torque to drive component 130 and rotating drive component 130 relative to center pin 110. Center pin 110 may be supported from rotation by various features of self-retractable centering assembly 100 further described below. Rotation of drive component 130 relative to center pin 110 linearly advances center pin 110 relatively to drive component 130. In other words, rotation direction 20 translates into sliding direction 30. Since drive component 130 is supported by puller bushing 120 relative to parts 10a and 10b (in the direction along center axis 119), the linear advancement of center pin 110 relative to drive component 130 also advances center pin 110 relative to parts 10a and 10b effectively retracting center pin 110 from determinant assembly alignment holes 12a and 12b. FIG. 1C is a schematic illustration of the same two parts 10a and 10b as in FIG. 1B after retracting center pin 110 from determinant assembly alignment holes 12a and 12b. The state of self-retractable centering assembly 100 shown in FIG. 1B may be referred to an extended state, while the state shown in FIG. 1C may be referred to a retracted state.

Examples of Self-Retractable Centering Assemblies

FIG. 2A is a schematic side view of self-retractable centering assembly 100, in accordance with some embodiments. Self-retractable centering assembly 100 comprises center pin 110, puller bushing 120, and drive component 130. Drive component 130 is rotatably coupled to puller bushing 120 using, for example, thrust bearing 150. Specifically, thrust bearing 150 may be disposed between drive component 130 and puller bushing 120 as, for example, shown in FIG. 2A. Other types of rotational slip couplings between drive component 130 and puller bushing 120 are also within the scope. This coupling allows for puller bushing 120 to support force along center axis 119 of center pin 110 exerted by drive component 130 during operation self-retractable centering assembly 100 while allowing drive component 130 to rotate relative to puller bushing 120.

Center pin 110 is slidable relative to puller bushing 120 between its extended state and retracted state with the extended state shown in FIG. 2A. Furthermore, center pin 110 comprises insertion portion 114. In the extended state, insertion portion 114 extends outside of puller bushing 120. In the retracted state, at least some of insertion portion 114 is retracted into puller bushing 120 as, for example, shown in FIG. 1B. Insertion portion 114 may be inserted, for example, into determinant assembly alignment holes 12a and 12b of parts 10a and 10b while aligning these parts as further described below with reference to FIG. 7 and FIGS. 8A-8I.

As shown in FIG. 2A, self-retractable centering assembly 100 may also include end component 140. End component 140 may be non-rotatably coupled to center pin 110 and may be used for supporting center pin 110 while, for example, rotating drive component 130. For example, end component 140 may have a shape of a hexagonal nut and a socket, wrench, or other suitable tool may be used to support end component 140 (and center pin 110) from rotation. Alternatively, other features of self-retractable centering assembly 100 may be use for supporting center pin 110.

As shown in FIG. 2A, self-retractable centering assembly 100 may also include surface engagement component 170. Surface engaging component 170 disposed on side 124 of puller bushing 120 opposite of drive component 130. This side 124 may extend substantially perpendicular to center axis 119 of center pin 110 and may be substantially planar. Alternatively, side 124 may be profiled similar to the side of a part facing puller bushing 120. Surface engaging component 170 may comprise polymer or other suitable materials. Surface engaging component 170 may be used to protect the surface of the part facing puller bushing 120 and more uniformly distribute the pressure applied on that surface by puller bushing 120 during operation of self-retractable centering assembly 100.

Some components and features of self-retractable centering assembly 100 may be disposed inside other component or hidden by other component. Referring to FIG. 2B, puller bushing 120 comprises cavity 122. Center pin 110 protrudes through cavity 122 of puller bushing 120. Center pin 110 may be slidable within cavity 129 relative puller bushing 120 along center axis 119 of center pin 110. This sliding features allows center pin 110 to move between its extended state and retracted state as described above with reference to FIGS. 1B and 1C.

Referring to FIG. 2B, center pin 110 comprises threaded portion 112. Drive component 130 threadably engages threaded portion 112 of center pin 110 such that rotation of drive component 130 relative to center pin 110 and around center axis 119 of center pin 110 slides center pin 110 relative to drive component 130 and also relative to puller bushing 120.

Drive component 130 may also rotate relative to puller bushing 120. However, their axial position along center axis 119 may remain substantially the same during operation of self-retractable centering assembly 100. As such, any axial movement of drive component 130 relative to center pin 110 may cause similar axial movement of puller bushing 120, also relative to center pin 110. When puller bushing 120 is positioned against parts, this axial movement may be used to retract center pin 110 from the parts. In other words, puller bushing 120 is used as a support for drive component 130 that allows for drive component 130 to rotate at least with respect to center pin 110 and, in some embodiments, with respect to parts that are aligned using self-retractable centering assembly 100.

Self-retractable centering assembly 100 may also comprise limiter 160 disposed within cavity 122 of puller bushing 120. Limiter 160 is used to limit sliding distance 103 of center pin 110 relative to puller bushing 120. As noted above, sliding distance 103 is the distance between the protracted position and retracted position. As such, limiter 160 may also define the protracted position and also the retracted position of center pin 110.

Referring to FIG. 2B, limiter 160 may be stop nut 160a threadably engaging threaded portion 112 of center pin 110. Stop nut 160a may not rotate relative to center pin 110 when drive component 130 rotates relatively center pin 110. Thereby, the linear position of stop nut 160a on center pin 110 may be preserved during operation of self-retractable centering assembly 100. In fact, stop nut 160a, center pin 110, and puller bushing 120 may not rotate relative to each other during operation of self-retractable centering assembly 100. For example, the internal surface of cavity 122 may engage the surface of stop nut 160a and prevent stop nut 160a from rotating around center axis 119. It should be noted that stop nut 160a may slide within cavity 122, and this sliding feature may define sliding distance 103. In fact, sliding distance 103 may be equal to the length of cavity 122 (defined along venter axis 119) less the thickness of stop nut 160a (defined in the same direction), which may be represented by the following formula: $D_{sliding} = Length_{cavity} - Thickness_{stop\ nut}$.

Referring to FIG. 3B that shows a cross-section of self-retractable centering assembly 100 in FIG. 3A, limiter 160 may be collar 160b of center pin 110. This collar 160b may be monolithic with the rest of center pin 110. For example, collar 160b may be machined during fabrication of center pin 110. Similar to the example of stop nut 160a described above with reference to FIG. 2B, collar 160b may slide within cavity 122 and this sliding may define sliding distance 103. In fact, sliding distance 103 may be equal the length of cavity 122 defined along venter axis 119 less the thickness of collar 160b defined in the same direction. However, in this example, threaded portion 112 may be shorter than in the example shown in FIG. 2B.

Referring briefly to FIGS. 3A and 3B, puller bushing 120 may include planar engagement surfaces 123. For example, two planar engagement surfaces 123 may be used in order to support puller bushing 120 with a wrench or any other suitable tool. As shown in FIG. 3A, planar engagement surfaces 123 may be parallel to each other and also parallel to center axis 119 of center pin 110.

Figure 4C:
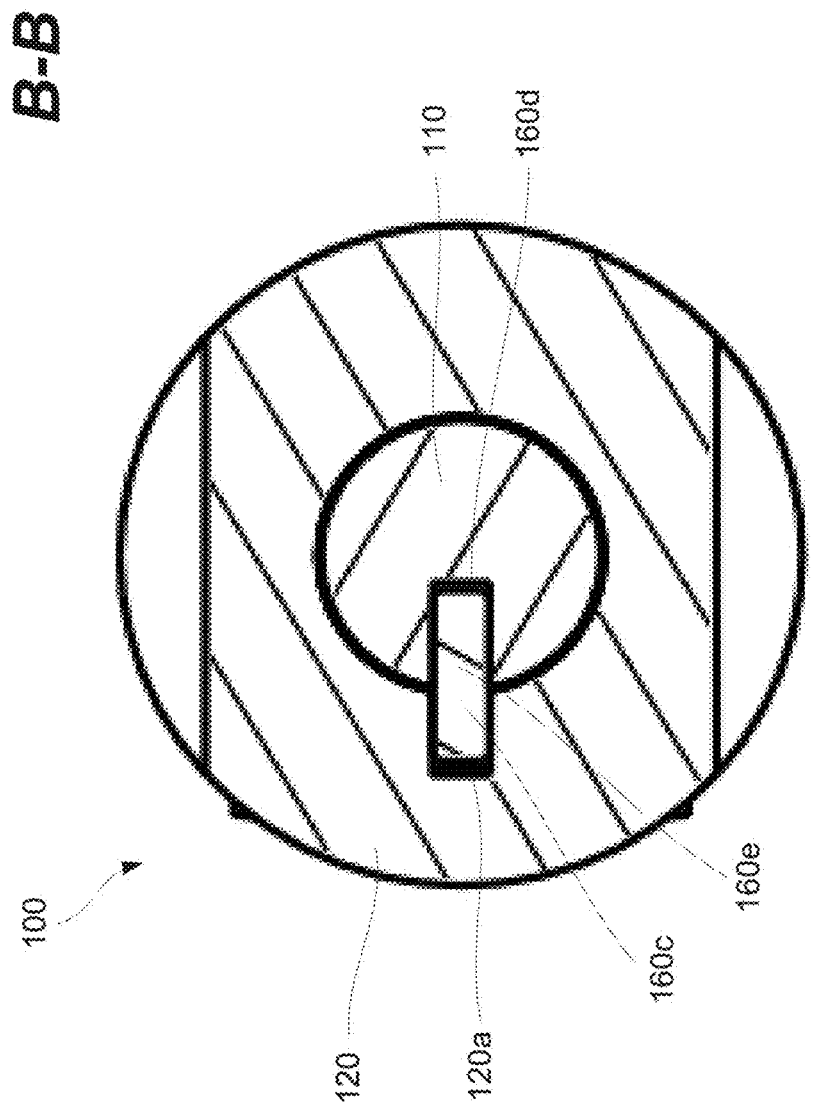

Referring to FIGS. 4B and 4C that shows a cross-section of self-retractable centering assembly 100 in FIG. 4A, limiter 160 may be slot key 160c protruding into slot 160d of center pin 110. One example of slot key 160c is Woodruff key 160e. However, other types of slot keys are also within the scope. Slot key 160c may operate similar to stop nut 160a or collar 160b even though it extends only in one direction away from center axis 119. Slot key 160c may slide between edges of cavity 122. In some embodiments, cavity 122 may include positive stops that limit sliding distance 103 of slot key 160c as, for example, is shown in FIG. 4B. In this example, the positive stops are transverse pins 121a and 121b protruding into openings in puller bushing 120 as schematically shown in FIG. 4B.

Referring to FIG. 5B that shows a cross-section of self-retractable centering assembly 100 in FIG. 5A, limiter 160 may be transverse pin 160f protruding through center pin 110 in direction 161 perpendicular to center axis 119 of center pin 110. End of transverse pin 160f extend away from center pin 110 and may limit sliding distance 103 when encounter positive stops or other components on its way. For example, FIG. 5B illustrates two other transverse pins 121a and 121b supported by puller bushing 120 and operable as positive stops.

Referring to FIG. 6B that shows a cross-section of self-retractable centering assembly 100 in FIG. 6A, limiter 160 may be a combination of sliding planar surface 160g of center pin 110 and protrusion 160h fixed relative puller bushing 120. Sliding planar surface 160g extends parallel to center axis 119 of center pin 100. Sliding distance 103 is limited by the length of sliding planar surface 160g defined in the direction of center axis. The end of sliding planar surface 160g act as positive stops.

In some embodiments, center pin 110 is not rotatable relative to puller bushing 120. In these embodiments, puller bushing 120 may be used to prevent center pin 110 from rotation (when drive component 130 is rotated) or to rotate center pin 110 at a different speed and/or different direction than drive component 130. It should be noted that even though center pin 110 may not rotate relative to puller bushing 120, it can still slide relative to puller bushing 120 in the direction of center axis 119.

Figure 2C:
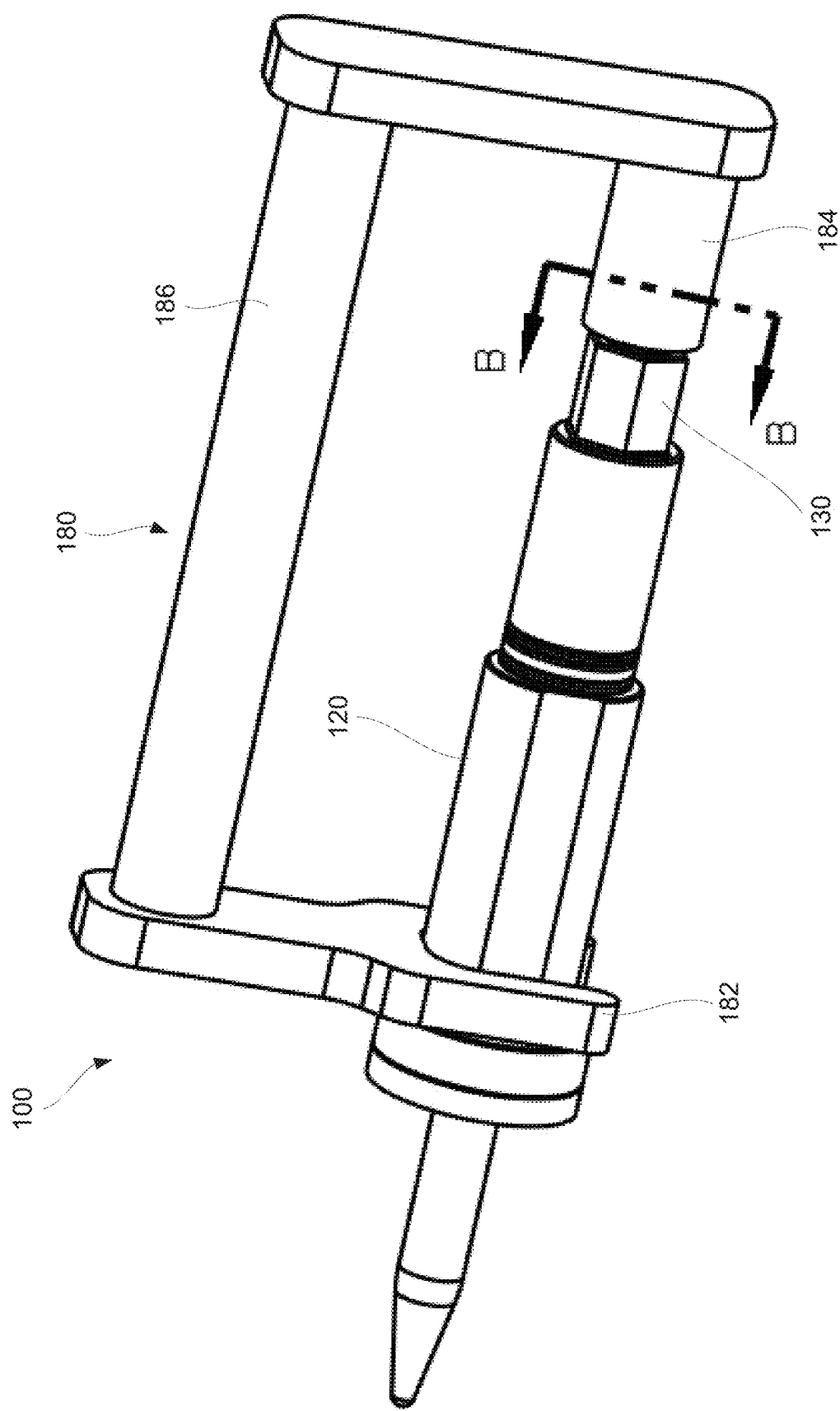
FIG. 2C is a schematic perspective view of the self-retractable centering assembly of FIG. 2A with an optional coupling component, in accordance with some embodiments.

In order to prevent center pin 110 from rotating relative to puller bushing 120 (maintaining their angular orientation), self-retractable centering assembly 100 may further comprise coupling component 180 non-rotatably engaging puller bushing 120 and center pin 110 as, for example, shown in FIG. 2C. Specifically, coupling component 180 may include first engagement component 182, second engagement component 184, and handle 186 extending between and connecting first engagement component 182 and second engagement component 184. First engagement component 182 may non-rotatably engage puller bushing 120. It should be noted that this non-rotatable engagement allows first engagement component 182 to slide relative to puller bushing 120 during operation of self-retractable centering assembly 100 (e.g., when extracting center pin 110). First engagement component 182 may be in the form of a fork, ring, or any other suitable shape.

Figure 2D:
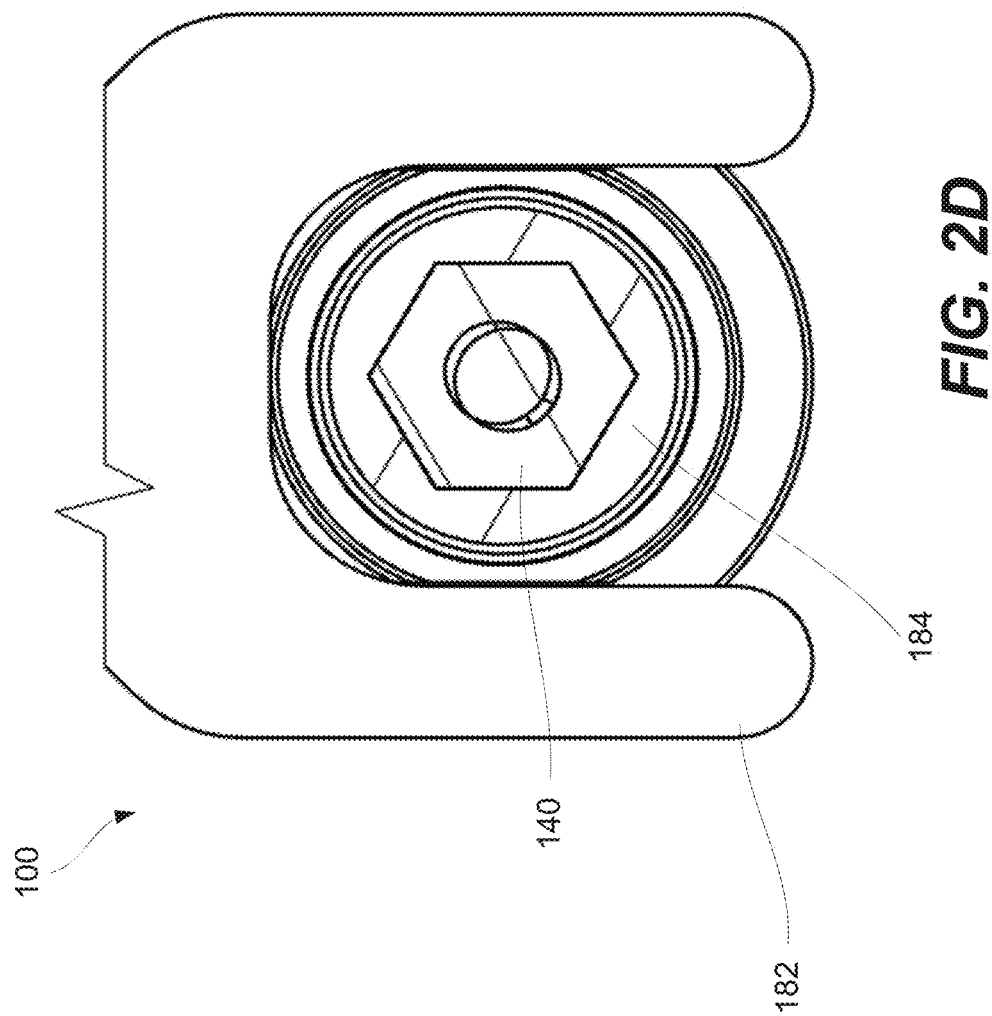
FIG. 2D is a schematic cross-sectional view of the self-retractable centering assembly of FIG. 2B illustrating engagement between the coupling component and other components of the assembly, in accordance with some embodiments.

Second engagement component 184 may non-rotatably engage center pin 110, for example, through end component 140. As noted above, end component 140 is non-rotatably connected to the end of center pin 110 opposite to insertion portion 114 of center pin 114. End component 140 may be a nut or any other suitable device. FIG. 2D is a cross-sectional representation of one example of second engagement component 184 non-rotatably engaging end component 140. In this example, end component 140 is a hexagonal nut (hex nut), while second engagement component 184 is a tubular hexagonal socket.

In addition to maintaining the angular position of center pin 110 and puller bushing 120, coupling component 180 allows the operator to support entire self-retractable centering assembly 100 with one hand. Referring to FIG. 2C, drive component 130 remains accessible and can be turned relative to coupling component 180 with a wrench or any other suitable tool. Rotation of drive component 130 relative to coupling component 180 will cause center pin 110 to slide relative to puller bushing 120. In some embodiments, this sliding of center pin 110 will also cause coupling component 180 to slide relative to puller bushing 120.

Another approach to prevent center pin 110 from rotating relative to puller bushing 120 (maintaining their angular orientation) is using one or more features provided directly on center pin 110 and puller bushing 120. Referring to FIGS. 3B and 3C, center pin 110 may comprise collar 160b disposed within cavity 122. Both collar 160b and cavity 122 have non-circular cross-sectional shapes within the plane (Y-Z) perpendicular to center axis 119 of center pin 110 such that the largest cross-sectional dimension of collar 160b is greater than the smallest cross-sectional dimension of cavity 122. One example of the non-circular cross-sectional shapes are shown in FIG. 3C. Specifically, in this example, collar 160b has flat portion 161 that contact planar portion 123 of puller bushing 120 and prevent rotation of center pin 110 relative to puller bushing 120. In some embodiments, cavity 122 may have an elliptical cross-sectional shape within a plane perpendicular to center axis 119 of center pin 110. Collar 160b may have a similar elliptical cross-sectional shape. However, other cross-sectional shapes are also within the scope.

Referring to FIGS. 4B and 4C, self-retractable centering assembly 100 may comprise slot key 160c protruding into slot 160d of center pin 110 and into sliding slot 120a of puller bushing 120. Slot key 160c may be slidable within sliding slot 120a. In other words, slot key 160c and, as a result, center pin 110 can slide relative to puller bushing 120. At the same time, this combination of slot key 160c and slot 160d results in center pin 110 being not rotatable relative to puller bushing 120.

Referring to FIGS. 5B and 5C, self-retractable centering assembly 100 may comprise transverse pin 160f protruding through center pin 110 in the direction (Y direction) perpendicular to center axis 119 of center pin 110. Transverse pin 160f extends away from center pin 110 and into two slots 120b of puller bushing 120. Transverse pin 160f may slide within two slots 120b relative to puller bushing 120 and, as a result, center pin 110 may slide relative to puller bushing 120. At the same time, this combination of transverse pin 160f and two slots 120b results in center pin 110 being not rotatable relative to puller bushing 120.

Figure 6C:
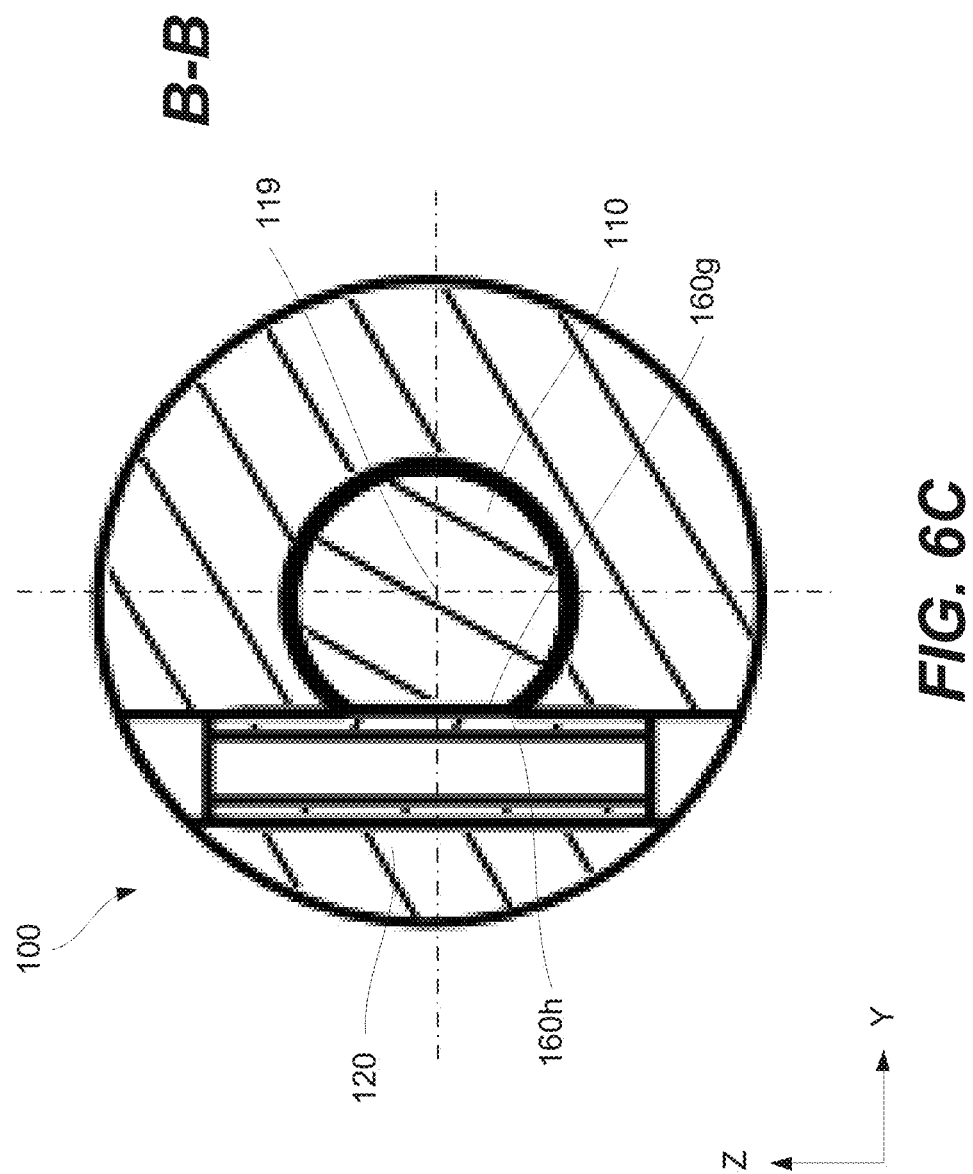

Referring to FIGS. 6B and 6C, self-retractable centering assembly 100 may comprise sliding planar surface 160g of center pin 110 and protrusion 160h fixed relative puller bushing 120. Sliding planar surface 160g extends parallel to center axis 119 of center pin 100. This combination of sliding planar surface 160g and protrusion 160h results in center pin 110 being not rotatable relative to puller bushing 120.

Examples of Methods Using Self-Retractable Centering Assemblies

Figure 7:
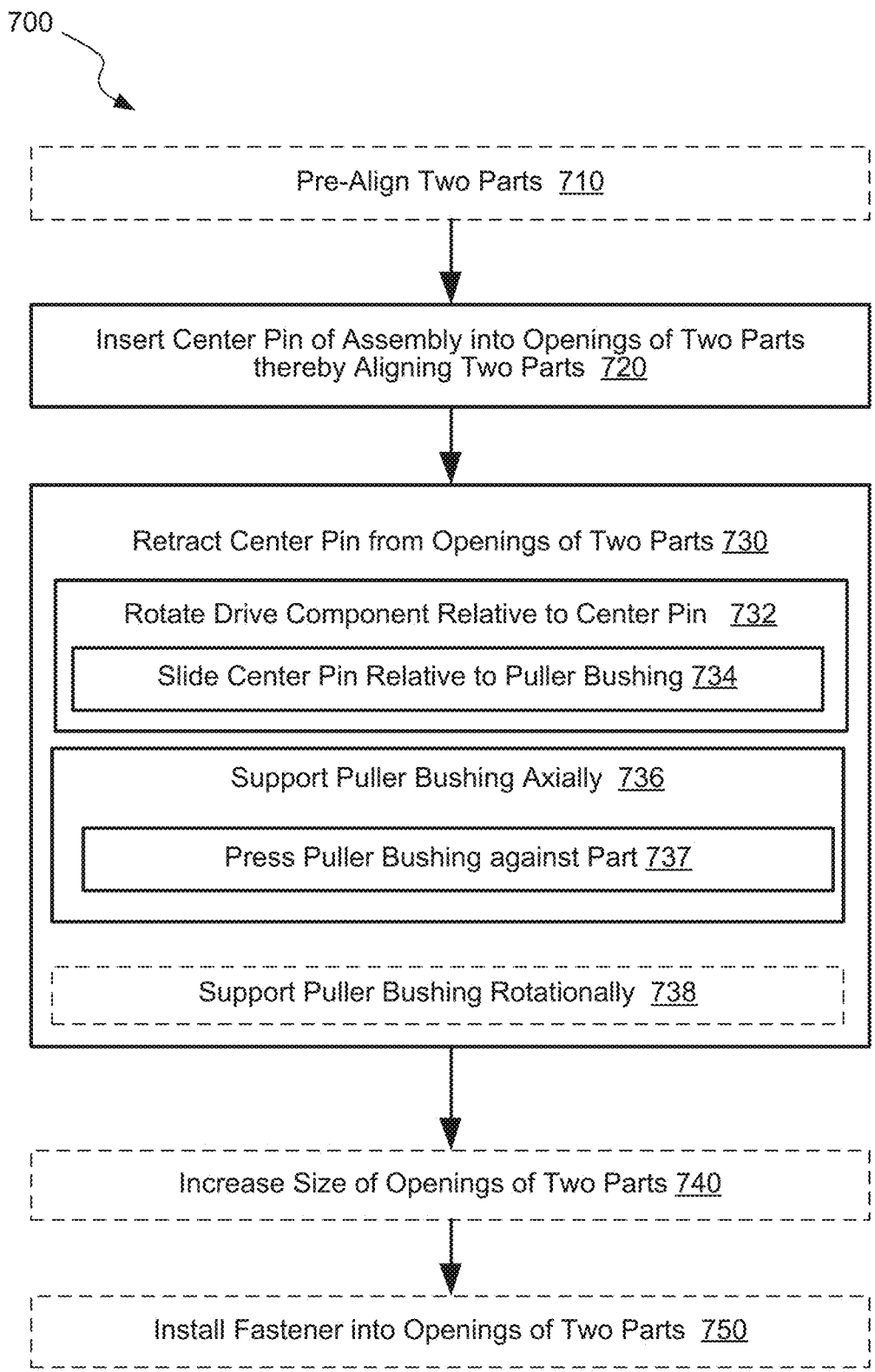
FIG. 7 is a process flowchart corresponding to a method of aligning two parts using a self-retractable centering assembly, in accordance with some embodiments.

FIG. 7 is a process flowchart corresponding to method 700 of aligning two parts 10a and 10b using self-retractable centering assembly 100, in accordance with some embodiments. Different stages of method 700 are schematically illustrated in FIGS. 8A-8I. Examples of self-retractable centering assembly 100 are described above.

Method 700 may commence with pre-aligning first part 10a relative to second part 10b during optional operation 710. First part 10a may comprise first determinant assembly alignment hole 12a, while second part 10b comprises second determinant assembly alignment hole 12b. This pre-alignment ensures that center pin 110 of self-retractable centering assembly 100 can be inserted in both determinant assembly alignment holes 12a and 12b. It may be referred to as rough alignment. Further alignment is provided when center pin 110 is inserted in both determinant assembly alignment holes 12a and 12b. The required level of the pre-alignment depends on the design of center pin 110 or, more specifically, the design of tip 116 of its insertion portion 114. In some embodiments, tip 116 has a tapered shape to allow for less precise pre-alignment. FIG. 2A illustrates first part 10a and second part 10b prior to operation 710, while FIG. 2A illustrates these parts 10a and 10b after operation 710. For example, after pre-alignment, center axis 14a of first determinant assembly alignment hole 12a is at least within the boundaries of second determinant assembly alignment hole 12b.

Method 700 may proceed with inserting center pin 110 of self-retractable centering assembly 100 into first determinant assembly alignment hole 12a and into second determinant assembly alignment hole 12b during operation 720. In some embodiments, center pin 110 may be in its extended state during this operation 720. For example, center pin 110 may be pressed, hammered, or otherwise inserted into determinant assembly alignment holes 12a and 12b. Alternatively, center pin 110 may be extended from puller bushing 120 as a part of operation 720.

The material of center pin 110 may be such that center pin 110 maintains its shape during insertion and retraction operations without damaging parts 10a and 10b. In general, the material of center pin 110 may be harder and mechanically stronger than the material of parts 10a and 10b, at least the material forming determinant assembly alignment holes 12a and 12b. In some embodiments, center pin 110 is formed from a hardened steel (e.g., medium carbon steel or high carbon steel). The material of parts 10a and 10b depends on the application and may be metal (e.g., aluminum, titanium), composite (e.g., carbon fiber), plastic, and the like.

Figure 8A:
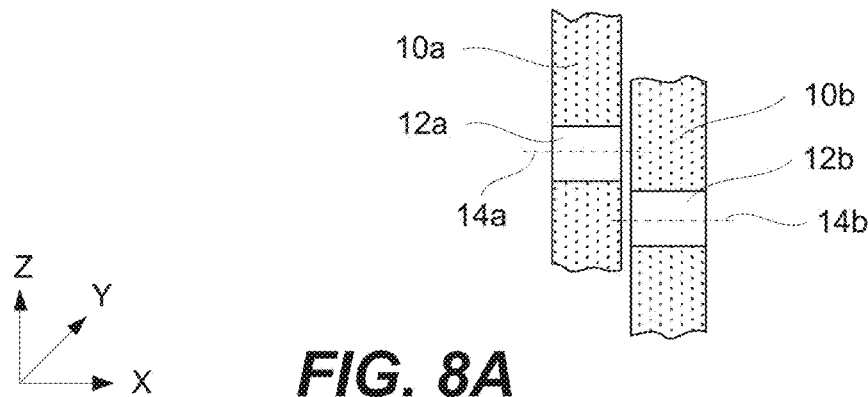
FIGS. 8A-8I are schematic cross-sectional views of the two parts at various stages of aligning these parts using a self-retractable centering assembly, in accordance with some embodiments.
Figure 8B:
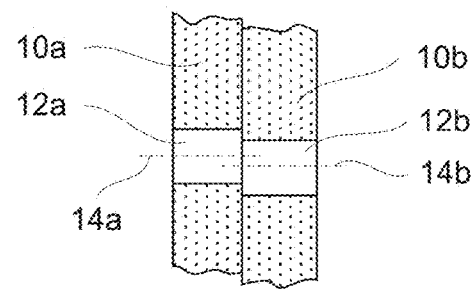
Figure 8C:
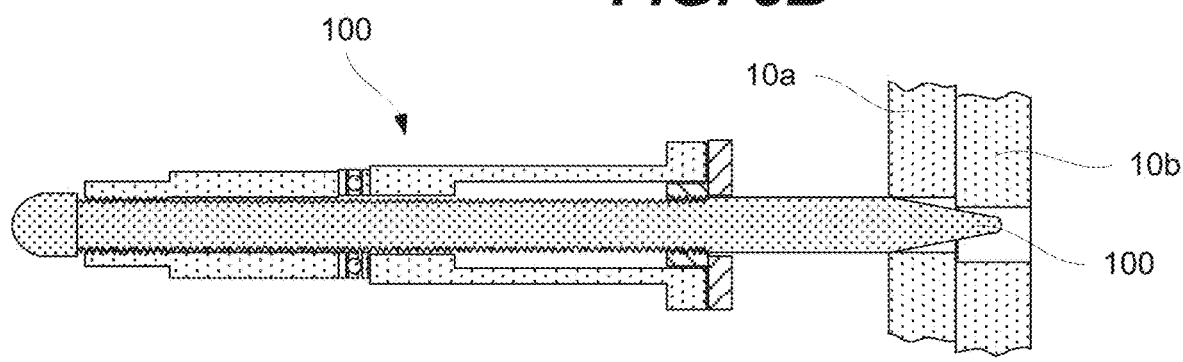
Figure 8D:
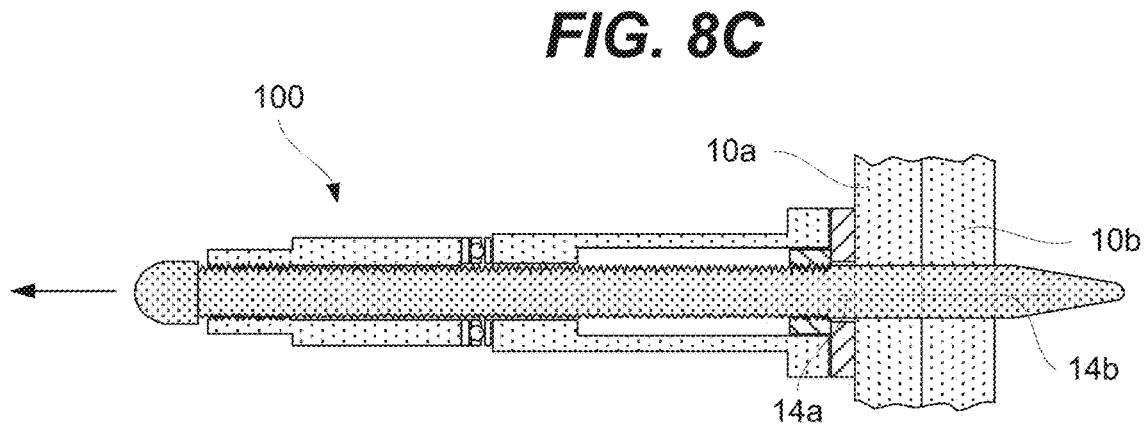

FIG. 8C is a schematic illustration of self-retractable centering assembly 100 and parts 10a and 10b at the beginning of operation 720, while FIG. 8D is a schematic illustration of the same component after operation 720 is completed. After completing operation 720, parts 10a and 10b are aligned. Specifically, after inserting center pin 110 into first determinant assembly alignment hole 12a and second determinant assembly alignment hole 12b, center axis 14a of first determinant assembly alignment hole 12a coincides with center axis 14b of second determinant assembly alignment hole 12b as, for example, schematically shown in FIG. 8D. Parts 10a and 10b may be fixed in the aligned state by various means, e.g., internal clamps, fasteners, welding, gluing, and other like methods.

Figure 8E:
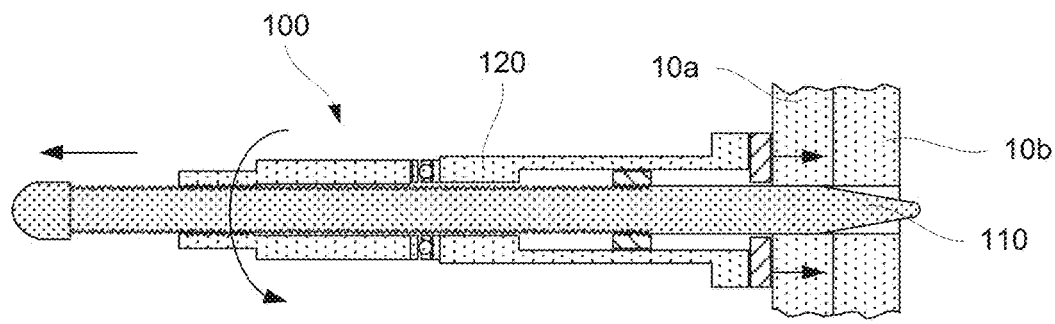
Figure 8F:
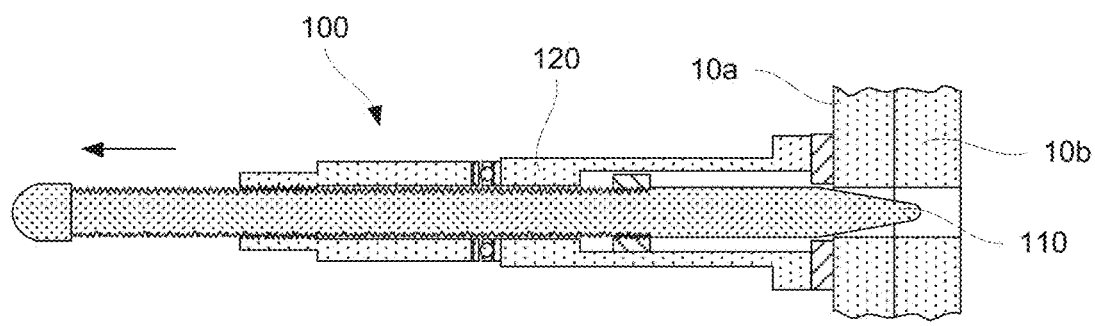
Figure 8G:
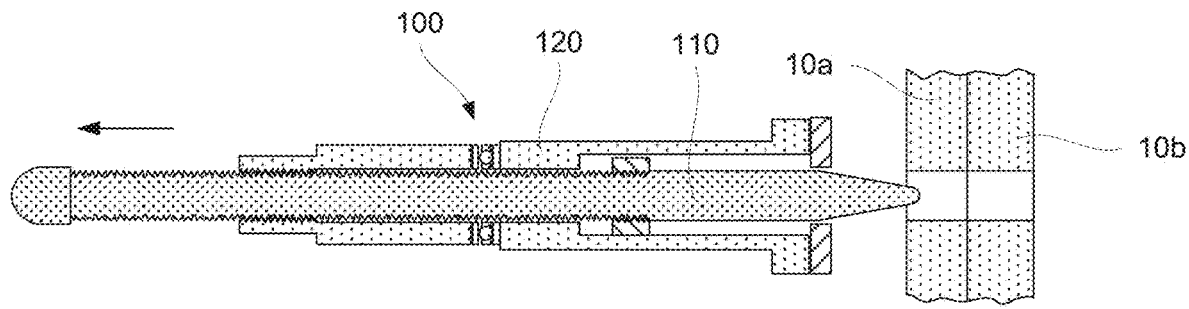

Method 700 may proceed with retracting center pin 110 from first determinant assembly alignment hole 10a and from second determinant assembly alignment hole 10b during operation 730. Different stages of retracting operation 730 are schematically shown in FIGS. 8D-8F. Specifically, FIG. 8D illustrates center pin 110 still fully extended and inserted into first determinant assembly alignment hole 10a and from second determinant assembly alignment hole 10b, and FIG. 8F illustrates center pin 110 still fully retracted and sufficiently removed from first determinant assembly alignment hole 10a and from second determinant assembly alignment hole 10b. At this stage, shown in FIG. 8F, center pin 110 is not supported by parts 10a and 10b and may be further pulled away without rotating drive component 130 relative to center pin 110 as, for example, schematically shown in FIG. 8G.

Retracting operation 730 comprises rotating drive component 130 relative to center pin 110 as shown by block 732. The rotation during retracting operation 830 may be around center axis 119 of center pin 110. This rotation causes center pin 110 to slide relative to puller bushing 120 as schematically shown by block 734. Puller bushing 120 may be supported axially during operation 730 as schematically shown by block 736. In other words, puller bushing 120 may not move along center axis 119 with respect to first part 10a and second part 10b during operation 730. More specifically, puller bushing 120 may be pressed against first part 10a while retracting center pin 110 as schematically shown in FIG. 8E and by block 737 in FIG. 7.

In some embodiments, rotating drive component 130 relative to center pin 110 during operation 730 comprises supporting puller bushing 120 rotationally as shown by optional block 738. In other words, puller bushing 120 may not rotate around center axis 119 with respect to first part 10a and second part 10b during operation 730. For example, puller bushing 120 may be supported by an operator using a wrench or some other suitable tool. In some embodiments, drive component 130 may be rotated relative to puller bushing 120 during operation 730. Puller bushing 120 may not rotate relative to center pin 110.

In some embodiments, center pin 110 does not rotate within first determinant assembly alignment hole 12a relative to first part 10a or within second determinant assembly alignment hole 12b relative to second part 10b as center pin 110 is being retracted from first determinant assembly alignment hole 12a and second determinant assembly alignment hole 12a. Furthermore, puller bushing 120 may be stationary relative to first part 10a as center pin 110 being retracted. Specifically, puller bushing 120 may not rotate relative to first part 10a.

Alternatively, puller bushing 120 rotates relative to first part 10a. In these embodiments, center pin 110 may also rotate within first determinant assembly alignment hole 12a relative to first part 10a or within second determinant assembly alignment hole 12b relative to second part 12b as center pin 110 is being retracted. Center pin 110 may also rotate relative to first part 10a at a different speed or in a different direction than drive component 130. In some embodiments, drive component 130 does not rotate relative to first part 10a.

Figure 8H:
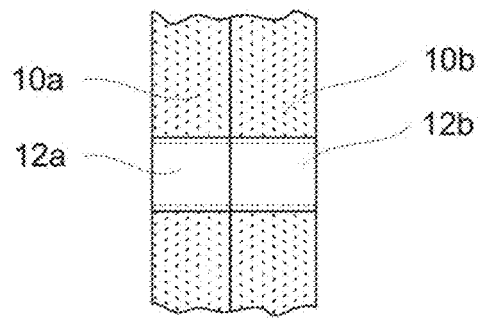

In some embodiments, after retracting center pin 110 from determinant assembly alignment holes 12a, method 700 proceeds with increasing size of first determinant assembly alignment hole 12a and second determinant assembly alignment hole 12b as shown by optional block 740 in FIG. 7. The original boundaries of first determinant assembly alignment hole 12a and second determinant assembly alignment hole 12b are shown in FIG. 8H with dashed lines.

Figure 8I:
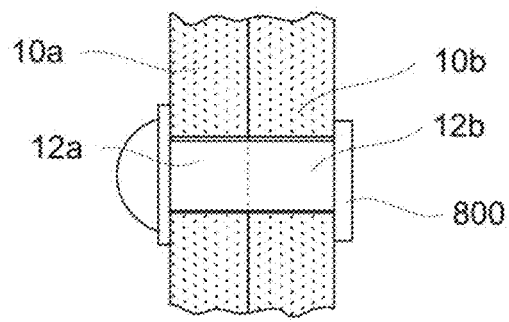

In same or other embodiments, after retracting center pin 110, method 700 proceeds with installing fastener 800 into first determinant assembly alignment hole 12a and second determinant assembly alignment hole 12b as shown by optional block 750 in FIG. 7. FIG. 8I illustrates two aligned parts 10a and 10b with fastener 800 installed into first determinant assembly alignment hole 12a and second determinant assembly alignment hole 12b. It should be noted that parts 10a and 10b may have multiple sets of determinant assembly alignment holes 12a and 12b. One or more of these sets (but not all) may be used for aligning parts 10a and 10b using one or more self-retractable centering assemblies 100. Specifically, center pin 110 of one of self-retractable centering assemblies 100 may be inserted into each set of determinant assembly alignment holes 12a and 12b used for alignment. While one or more center pins 110 remain inserted in respective determinant assembly alignment holes 12a and 12b, the remaining ones of determinant assembly alignment holes 12a and 12b may be used to secure parts 10a and 10b in their aligned state. Specifically, fastener 800 may be installed into each of these sets of determinant assembly alignment holes 12a and 12b. Optionally, the size of these determinant assembly alignment holes 12a and 12b may be increased prior to installing fastener 800. Once parts 10a and 10b are secured in their aligned state, center pins 110 of self-retractable centering assemblies 100 may be retracted from determinant assembly alignment holes 12a and 12b used for alignment. Additional fasteners 800 may be then installed into these determinant assembly alignment holes 12a and 12b.

In some embodiments, determinant assembly alignment holes 12a and 12b are used for aligning parts 10a and 10b using one or more self-retractable centering assemblies 100. Specifically, center pin 110 of one of self-retractable centering assemblies 100 may be inserted into each set of determinant assembly alignment holes 12a and 12b. While one or more center pins 110 remain inserted in respective determinant assembly alignment holes 12a and 12b, additional holes are formed in parts 10a and 10b. These additional holes are used to secure parts 10a and 10b in their aligned state. Specifically, fastener 800 may be installed into each of these additional holes. It should be noted that these holes are formed and the fasteners are installed in these holes while parts 10a and 10b are remain aligned with self-retractable centering assemblies 100. Once parts 10a and 10b are secured in their aligned state by installing the fasteners into the additional holes, center pins 110 of self-retractable centering assemblies 100 may be retracted from determinant assembly alignment holes 12a and 12b used for alignment. Parts 10a and 10b are retained in the aligned state by the fasteners. In some embodiments, additional fasteners 800 may be then installed into determinant assembly alignment holes 12a and 12b previously used for aligning.

Examples of Aircraft Application

Figure 9:
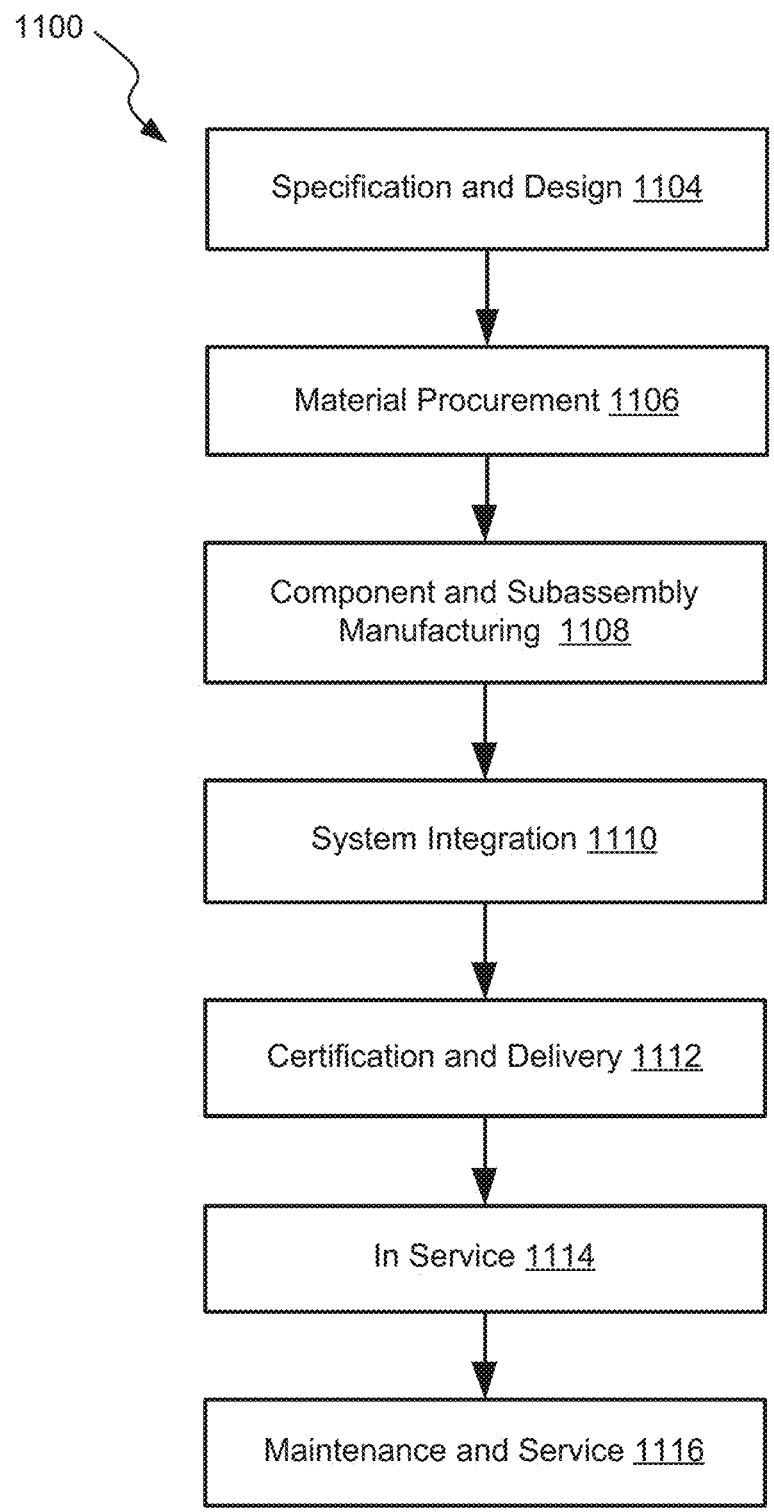
FIG. 9 is a block diagram of aircraft production and service methodology that may utilize methods and assemblies described herein.
Figure 10:
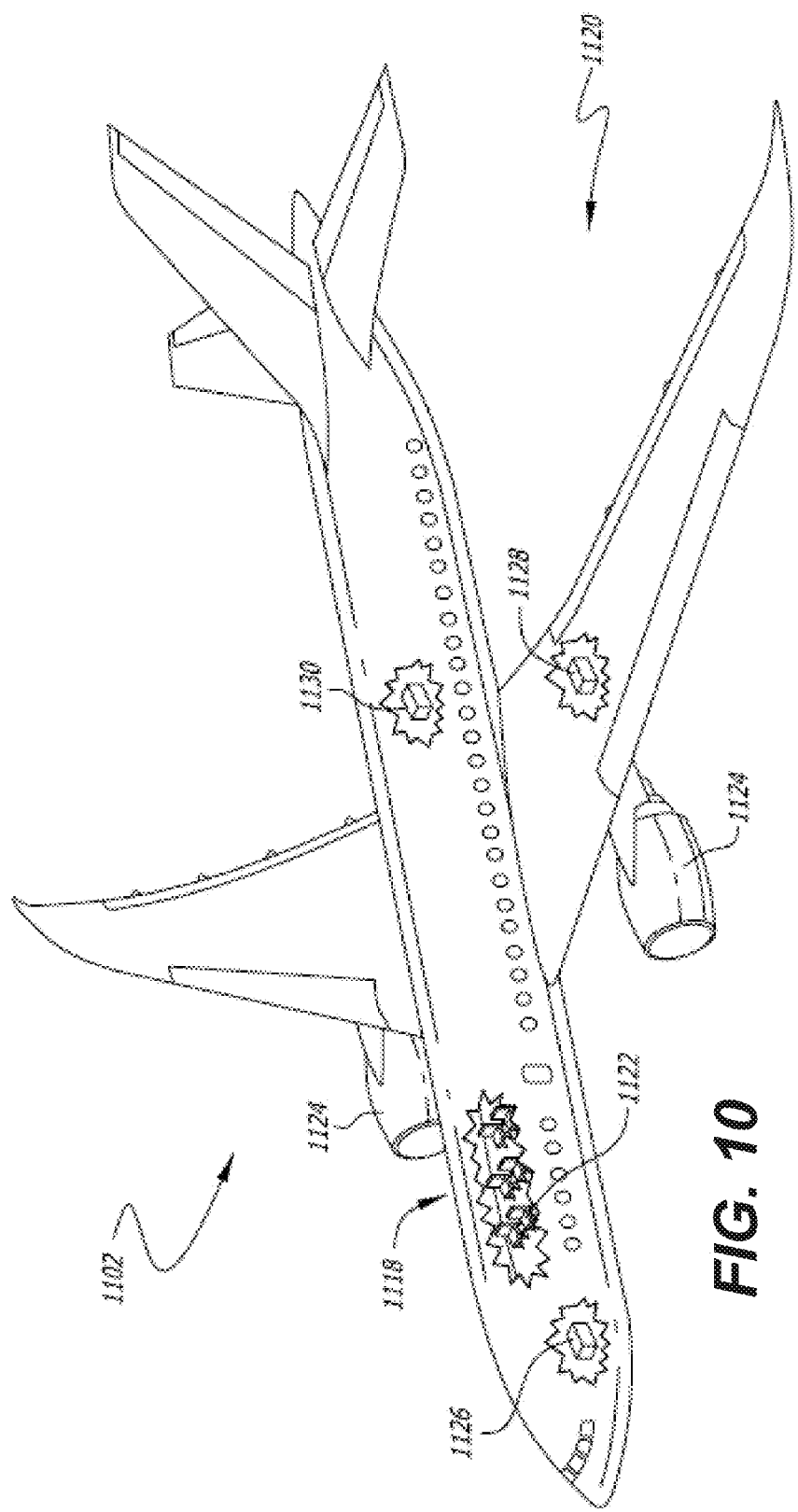
FIG. 10 is a schematic representation of the aircraft produced utilizing methods and assemblies described herein.

Examples of the disclosure may be described in the context of an aircraft manufacturing and service method 1100 as shown in FIG. 9 and aircraft 1102 as shown in FIG. 10. During pre-production, illustrative method 1100 may include specification and design 1104 of the aircraft 1102 and material procurement 1106. During production, component and subassembly manufacturing 1108 and system integration 1110 of aircraft 1102 take place. For example, self-retractable centering assembly 100 may be used during operation 1108 or operation 1110. Thereafter, aircraft 1102 may go through certification and delivery 1112 to be placed in service 1114. In some embodiments, self-retractable centering assembly 100 may be used during operation 1112 or operation 1114. While in service by a customer, aircraft 1102 is scheduled for routine maintenance and service 1116 (which may also include modification, reconfiguration, refurbishment, and so on. Self-retractable centering assembly 100 may be used during these later operations as well.

Each of the processes of illustrative method 1100 may be performed or carried out by a system integrator, a third party, and/or an operator (e.g., a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus and methods shown or described herein may be employed during any one or more of the stages of the aircraft manufacturing and service method 1100. For example, components or subassemblies corresponding to component and subassembly manufacturing 1108 may be fabricated or manufactured in a manner similar to components or subassemblies produced while aircraft 1102 is in service. Also, one or more aspects of the apparatus, method, or combination thereof may be utilized during operations 1108 and 1110, for example, by substantially expediting assembly of or reducing the cost of aircraft 1102. Similarly, one or more aspects of the apparatus or method realizations, or a combination thereof, may be utilized, for example and without limitation, while aircraft 1102 is in service, e.g., maintenance and service 1116.

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A self-retractable centering assembly comprising:
   a center pin, comprising a center axis;
   a puller bushing, comprising a cavity,
     the center pin protruding through the puller bushing,
     the center pin being slidable relative the puller bushing along the center axis of the center pin;
   a drive component, rotatably coupled to the puller bushing,
     the center pin being slidable relative to the drive component along the center axis of the center pin.

2. The self-retractable centering assembly of claim 1, wherein the center pin comprises a threaded portion, threadably engaging the drive component such that rotation of the drive component relative to the center pin and around the center axis of the center pin slides the center pin relative to the drive component and to the puller bushing.

3. The self-retractable centering assembly of claim 1, wherein the center pin is non-rotatable relative to the puller bushing.

4. The self-retractable centering assembly of claim 3, further comprising a coupling component non-rotatably engaging the puller bushing and the center pin.

5. The self-retractable centering assembly of claim 3, wherein the center pin comprises a collar disposed within the cavity such that both the collar and the cavity have non-circular cross-sectional shapes within a plane perpendicular to the center axis of the center pin.

6. The self-retractable centering assembly of claim 3, further comprising a slot key protruding into a slot of the center pin and into a sliding slot of the puller bushing.

7. The self-retractable centering assembly of claim 3, further comprising a transverse pin protruding through the center pin in a direction perpendicular to the center axis of the center pin and extending away from the center pin and into two slots of the puller bushing.

8. The self-retractable centering assembly of claim 3, further comprising a sliding planar surface of the center pin and a protrusion fixed relative the puller bushing, wherein the sliding planar surface extends parallel to the center axis of the center pin.

9. The self-retractable centering assembly of claim 1, further comprising a limiter, disposed within the cavity of the puller bushing and limiting a sliding distance of the center pin relative to the puller bushing.

10. The self-retractable centering assembly of claim 9, wherein the limiter is selected from the group consisting of a stop nut threadably engaging a threaded portion of the center pin, a collar of the center pin, a slot key protruding into a slot of the center pin, a Woodruff key protruding into a slot of the center pin, a transverse pin protruding through the center pin in a direction perpendicular to the center axis of the center pin and extending away from the center pin, and a combination of a sliding planar surface of the center pin and a protrusion fixed relative the puller bushing, and wherein the sliding planar surface extends parallel to the center axis of the center pin.

11. A method of aligning a first part relative to a second part, the method comprising:
   retracting a center pin of a self-retractable centering assembly from a first determinant assembly alignment hole of the first part and from a second determinant assembly alignment hole of the second part,
     retracting the center pin comprising rotating a drive component of the self-retractable centering assembly relative to the center pin.

12. The method of claim 11, wherein the drive component s rotated around a center axis of the center pin.

13. The method of claim 11, wherein rotating the drive component relative to the center pin causes the center pin to advance axially relative to the drive component and relative to the first part and the second part.

14. The method of claim 11, wherein retracting the center pin comprises pressing a puller bushing against the first part, the center pin extending through the puller bushing, the puller bushing being positioned between the drive component and the first part.

15. The method of claim 14, wherein retracting the center pin comprises sliding the center pin relative to the puller bushing.

16. The method of claim 14, wherein, while sliding the center pin relative to the puller bushing, the center pin does not rotate relative to the puller bushing.

17. The method of claim 11, wherein rotating the drive component relative to the center pin comprises rotationally supporting a puller bushing.

18. The method of claim 11, wherein the center pin does not rotate within the first determinant assembly alignment hole relative to the first part or within the second determinant assembly alignment hole relative to the second part as the center pin is being retracted from the first determinant assembly alignment hole and from the second determinant assembly alignment hole.

19. The method of claim 18, wherein a puller bushing of the self-retractable centering assembly is stationary relative to the first part while retracting the center pin.

20. The method of claim 18, wherein a puller bushing of the self-retractable centering assembly rotates relative to the first part while retracting the center pin.

* * * * *